US010423557B2

(12) United States Patent
Shinto et al.

(10) Patent No.: US 10,423,557 B2
(45) Date of Patent: Sep. 24, 2019

(54) INFORMATION PROCESSING APPARATUS AND SEMICONDUCTOR INTEGRATED CIRCUIT INCLUDING RING BUS SYSTEM

(71) Applicant: CANON KABUSHIKI KAISHA, Tokyo (JP)

(72) Inventors: Yasushi Shinto, Inagi (JP); Yasutomo Tanaka, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/693,611

(22) Filed: Sep. 1, 2017

(65) Prior Publication Data

US 2018/0074986 A1  Mar. 15, 2018

(30) Foreign Application Priority Data

Sep. 13, 2016 (JP) ................................ 2016-178589

(51) Int. Cl.
*G06F 13/40* (2006.01)
*G06F 3/12* (2006.01)

(52) U.S. Cl.
CPC ........ *G06F 13/4004* (2013.01); *G06F 3/1279* (2013.01); *G06F 13/4068* (2013.01)

(58) Field of Classification Search
None
See application file for complete search history.

(56) References Cited

U.S. PATENT DOCUMENTS

2002/0105676 A1* 8/2002 Fujiwara .............. H04N 1/0083
358/1.15
2003/0164975 A1* 9/2003 Aoyagi ................ H04N 19/423
358/1.15
2005/0206665 A1* 9/2005 Kaneko ................ H04N 1/0057
347/5

(Continued)

FOREIGN PATENT DOCUMENTS

CN       102163181 A     8/2011
CN       103441915 A    12/2013

(Continued)

OTHER PUBLICATIONS

Japanese Office Action issued in corresponding Japanese Application No. 2016178589 dated Jul. 3, 2018.

(Continued)

*Primary Examiner* — Henry Tsai
*Assistant Examiner* — Aurangzeb Hassan
(74) *Attorney, Agent, or Firm* — Venable LLP

(57) ABSTRACT

Even in the case where a ring bus interface that is connected to an internal ring bus of an LSI is provided as an interface of the LSI in order to add a new image processing function, the position of a function extension module on the ring bus is fixed. An information processing apparatus including: a first controller unit having a plurality of modules and a ring bus that connects the plurality of modules in the form of a ring; and a second controller unit having a plurality of modules and a ring bus that connects the plurality of modules in the form of a ring, and the first controller unit (Continued)

having an interface that transmits data to the ring bus within the second controller unit and a switch capable of switching an output destination of data output from at least one of the plurality of modules of the first controller unit to the interface.

22 Claims, 25 Drawing Sheets

(56) References Cited

U.S. PATENT DOCUMENTS

| | | | | |
|---|---|---|---|---|
| 2008/0180703 | A1* | 7/2008 | Yamada | G06F 3/1204 358/1.9 |
| 2013/0060993 | A1* | 3/2013 | Park | G11C 7/1006 711/103 |
| 2015/0077781 | A1* | 3/2015 | Asai | H04N 1/00915 358/1.13 |
| 2016/0005453 | A1 | 1/2016 | Seo | |
| 2016/0034411 | A1* | 2/2016 | Smith | G06F 13/4022 710/116 |
| 2016/0269581 | A1* | 9/2016 | Matsunami | H04N 1/00557 |

FOREIGN PATENT DOCUMENTS

| | | |
|---|---|---|
| JP | 08137819 A | 5/1996 |
| JP | 11045136 A | 2/1999 |
| JP | 2001134527 A | 5/2001 |
| JP | 2005-056112 | 3/2005 |
| JP | 2005346669 A | 12/2005 |
| JP | 2006246493 A | 9/2006 |
| WO | 2012100984 A1 | 8/2012 |

OTHER PUBLICATIONS

Chinese Office Action issued in corresponding Chinese Application No. 201710822265.3 dated May 27, 2019.

* cited by examiner

| FIG.14A | FIG.14B | FIG.14C |

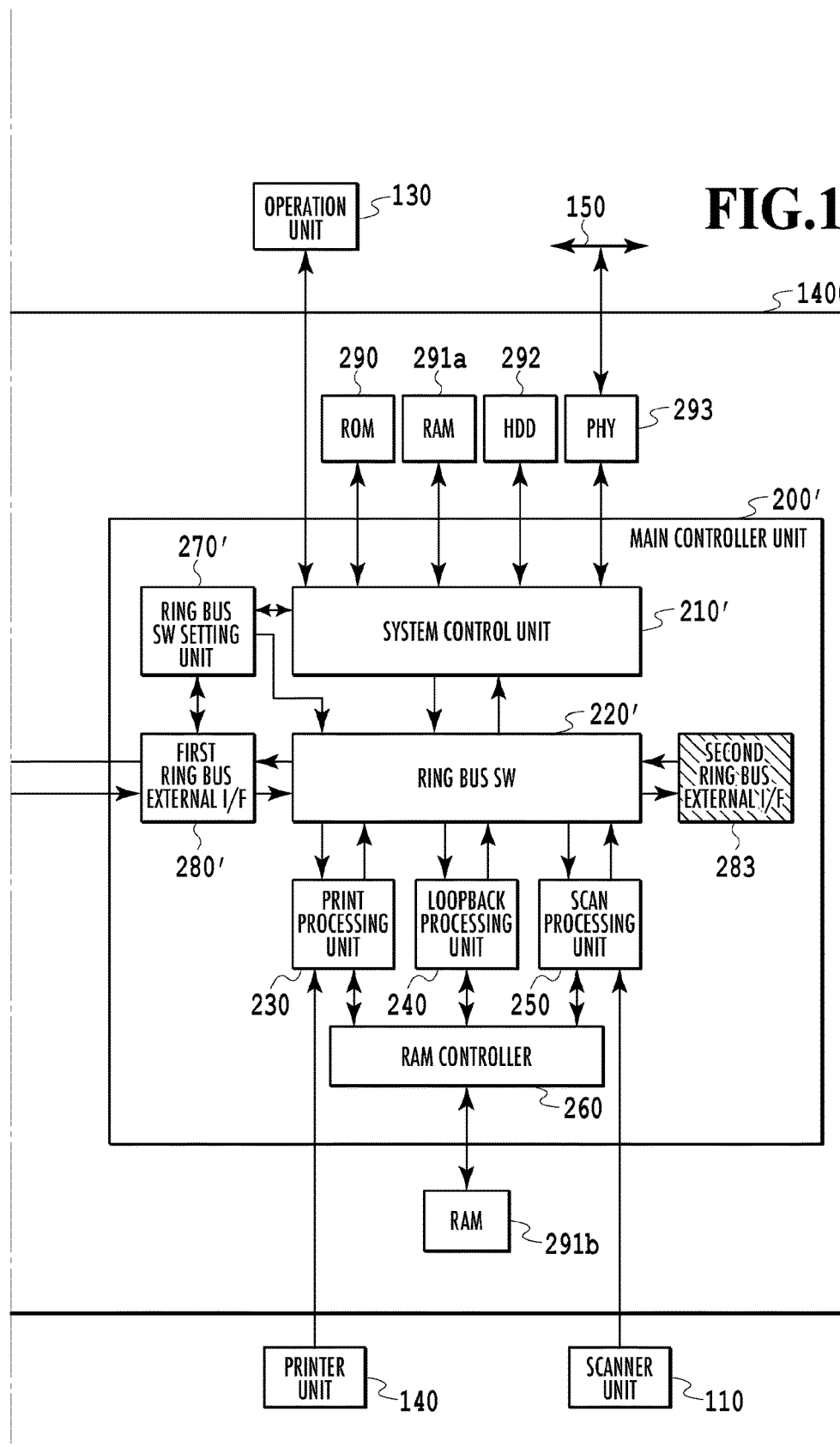

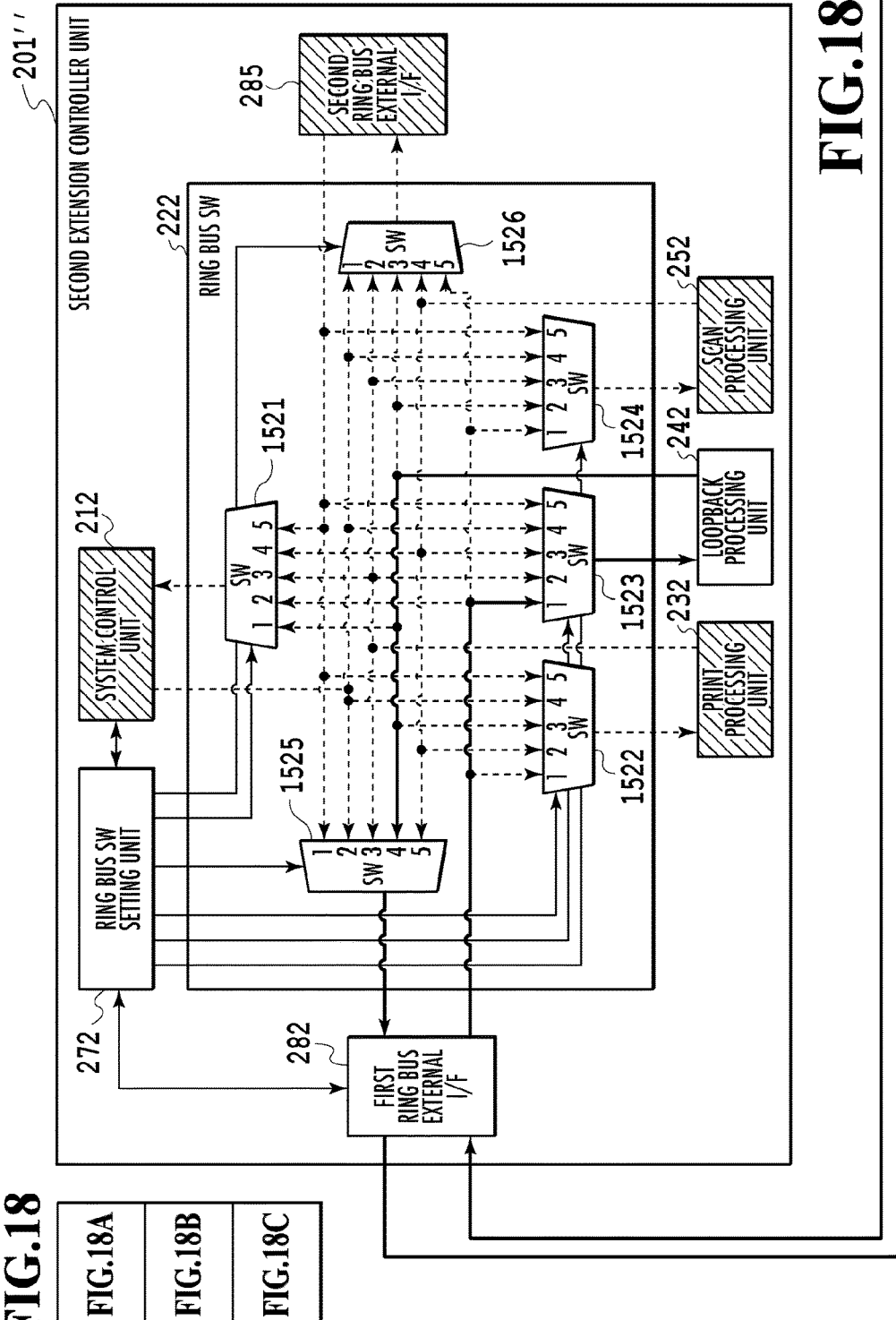

RING BUS SW SETTING UNIT — 270'

CONTROL REGISTER OF SW 1501 — 1910

| bit4 CONNECTED WITH input 5 | bit3 CONNECTED WITH input 4 | bit2 CONNECTED WITH input 3 | bit1 CONNECTED WITH input 2 | bit0 CONNECTED WITH input 1 |
|---|---|---|---|---|

CONTROL REGISTER OF SW 1502 — 1920

| bit4 CONNECTED WITH input 5 | bit3 CONNECTED WITH input 4 | bit2 CONNECTED WITH input 3 | bit1 CONNECTED WITH input 2 | bit0 CONNECTED WITH input 1 |
|---|---|---|---|---|

CONTROL REGISTER OF SW 1503 — 1930

| bit4 CONNECTED WITH input 5 | bit3 CONNECTED WITH input 4 | bit2 CONNECTED WITH input 3 | bit1 CONNECTED WITH input 2 | bit0 CONNECTED WITH input 1 |
|---|---|---|---|---|

CONTROL REGISTER OF SW 1504 — 1940

| bit4 CONNECTED WITH input 5 | bit3 CONNECTED WITH input 4 | bit2 CONNECTED WITH input 3 | bit1 CONNECTED WITH input 2 | bit0 CONNECTED WITH input 1 |
|---|---|---|---|---|

CONTROL REGISTER OF SW 1505 — 1950

| bit4 CONNECTED WITH input 5 | bit3 CONNECTED WITH input 4 | bit2 CONNECTED WITH input 3 | bit1 CONNECTED WITH input 2 | bit0 CONNECTED WITH input 1 |
|---|---|---|---|---|

CONTROL REGISTER OF SW 1506 — 1960

| bit4 CONNECTED WITH input 5 | bit3 CONNECTED WITH input 4 | bit2 CONNECTED WITH input 3 | bit1 CONNECTED WITH input 2 | bit0 CONNECTED WITH input 1 |
|---|---|---|---|---|

FIG.19

INFORMATION PROCESSING APPARATUS AND SEMICONDUCTOR INTEGRATED CIRCUIT INCLUDING RING BUS SYSTEM

BACKGROUND OF THE INVENTION

Field of the Invention

The present invention relates to a ring bus system that performs data transfer by connecting a plurality of buses in the form of a ring.

Description of the Related Art

A digital multi-function printer having a variety of functions, such as a function as a scanner or a printer, a copy function, and fax transmission/reception function, includes a control unit configured to control input/output operations of image data with an external device and a plurality of image processing units configured to perform predetermined image processing for image data. Then, by employing a ring bus system that performs data transfer by connecting buses between the control unit and a plurality of image processing units in the form of a ring as a controller architecture thereof, it is possible to easily change a device configuration. In the bus that connects the control unit and a plurality of image processing units in the form a ring (hereinafter, ring bus), the control unit is the starting point and the endpoint of image data that flows on the ring bus. Because of this, in the bus close to the output side of the control unit (upstream of ring bus), the bandwidth at the time of output from the control unit becomes the greatest. Further, in the bus close to the input side of the control unit (downstream of ring bus), the bandwidth at the time of input to the control unit becomes the greatest. Consequently, by arranging, among the plurality of image processing units, the image processing unit in charge of the image output function to a printer on the upstream of the ring bus and the image processing unit in charge of the image input function from a scanner on the downstream of the ring bus, the bandwidth on the ring bus is allocated efficiently. Due to this, at the time of making use of the printer function, it is possible to perform printing by outputting image data from the control unit at a high speed and at the time of making use of the scanner function, it is possible to input the image data read by the scanner to the control unit at a high speed. As described above, in order to efficiently perform data transfer on the ring bus, it is important how to connect each image processing unit. Regarding this point, as a method of improving data transfer efficiency in a ring bus system, a technique has been proposed that selects the transfer direction of the ring bus so as to make it possible to perform transfer between the transfer source module and the transfer destination module on the ring bus through the shortest route (Japanese Patent Laid-Open No. 2005-56112).

On the other hand, in recent years, it is made possible to implement a large number of functions in one LSI (Large-Scaled Integrated circuit). Because of this, it is made possible to construct a control unit and a plurality of image processing units in one LSI while keeping a configuration in which they are connected by a ring bus.

However, in the case of a configuration in which a control unit and a plurality of image processing units are connected by a ring bus within one LSI, there is such a problem that it is not possible to easily change the device configuration. The reason is that even in the case where a ring bus interface that is connected to an internal ring bus of the LSI is provided as an interface of the LSI in order to add a new image processing function, the position of the function extension module on the ring bus is fixed.

SUMMARY OF THE INVENTION

The information processing apparatus according to the present invention includes: a first controller unit having a plurality of modules and a ring bus that connects the plurality of modules in the form of a ring; and a second controller unit having a plurality of modules and a ring bus that connects the plurality of modules in the form of a ring, and the first controller unit has an interface that transmits data to the ring bus within the second controller unit and a switch capable of switching an output destination of data output from at least one of the plurality of modules of the first controller unit to the interface.

Further features of the present invention will become apparent from the following description of exemplary embodiments with reference to the attached drawings.

BRIEF DESCRIPTION OF THE DRAWINGS

FIG. 19 is a diagram showing an internal configuration of a ring bus switch setting unit according to the second embodiment;

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment

Figure 1:
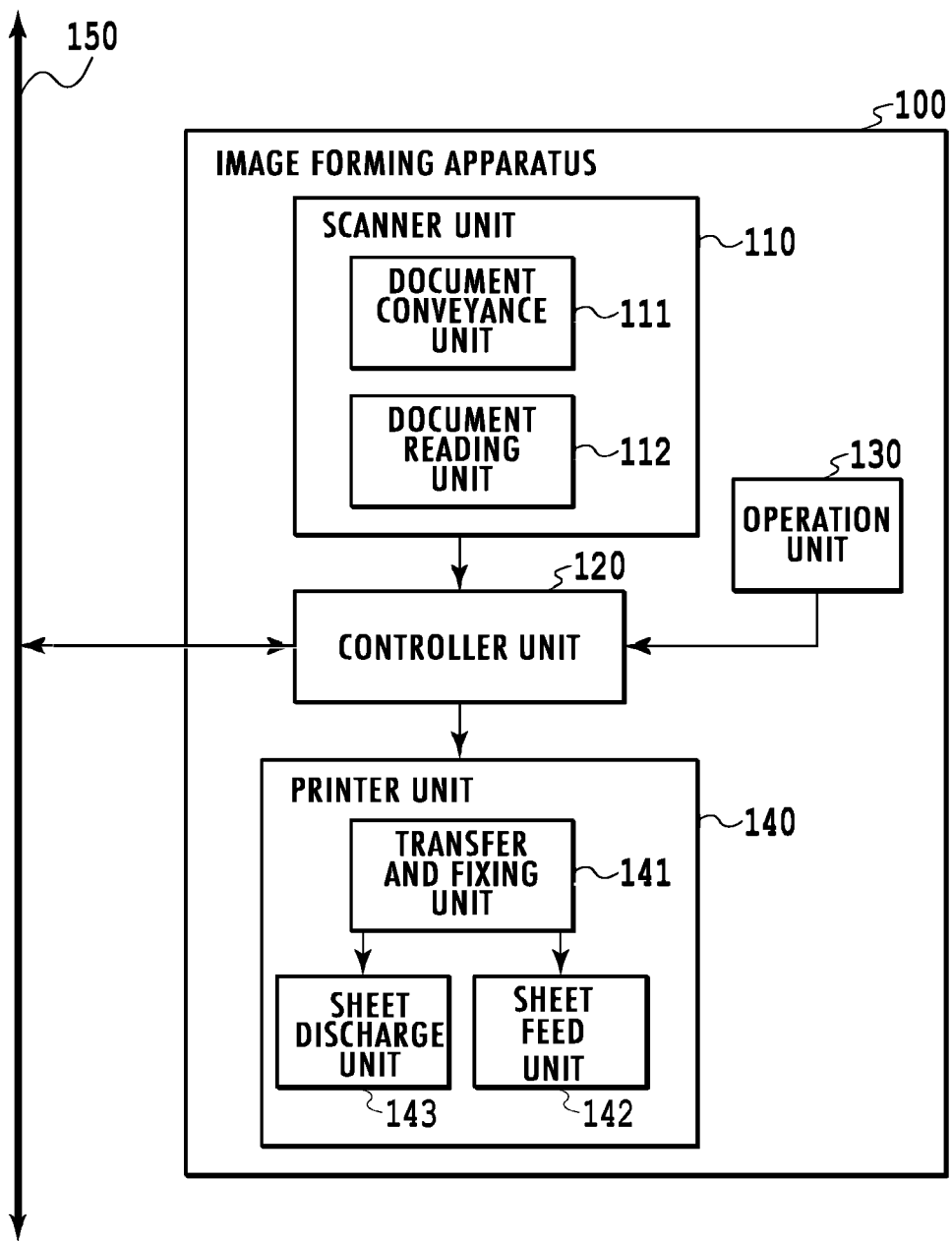
FIG. 1 is a block diagram showing an example of a configuration of a digital multi-function printer.

FIG. 1 is a block diagram showing an example of a configuration of a digital multi-function printer as an image forming apparatus (information processing apparatus) according to the present embodiment. A scanner unit 110 optically reads a document and converts the document into image data. Further, the scanner unit 110 includes a document reading unit 112 made up of a laser light source, a lens, and so on to optically read a document, and a document conveyance unit 111 made up of a belt or the like that conveys a document. A printer unit 140 conveys a printing medium (sheet) and prints image data as a visible image thereon. The printer unit 140 includes a sheet feed unit 142 configured to feed a sheet, a transfer and fixing unit 141 configured to transfer image data to a sheet and to fix the image, and a sheet discharge unit 143 configured to sort and staple a printed sheet and to discharge the printed sheet to the outside of the apparatus. A controller unit 120 is electrically connected with the scanner unit 110 and the printer unit 140 and is further connected with a network 150, such as a LAN, an ISDN, the Internet, and an intranet. In the case where a user makes use of the copy function, the controller unit 120 acquires image data of a document by controlling the scanner unit 110, prints an image on a sheet by controlling the printer unit 140, and outputs the sheet. Further, in the case where a user makes use of the scan function, the controller unit 120 acquires image data of a document by controlling the scanner unit 110, converts the image data into code data, and transmits the code data to a host PC (not shown schematically) or the like via the network 150. In the case where a user makes use of the print function, the controller unit 120 converts print data (code data) received from the host PC via the network 150 into image data, prints an image on a sheet by controlling the printer unit 140, and outputs the sheet. Further, the image forming apparatus also has a FAX reception function to receive data from the ISDN or the like and to perform printing and a FAX transmission function to transmit scanned data to the ISDN or the like. Instructions to perform processing in each function are called a job and an image forming apparatus 100 performs predetermined processing in accordance with a job corresponding to each function. An operation unit 130 is a user interface for a user to perform an input operation and includes, for example, a touch panel and various buttons.

<Controller Unit>

Figure 2:
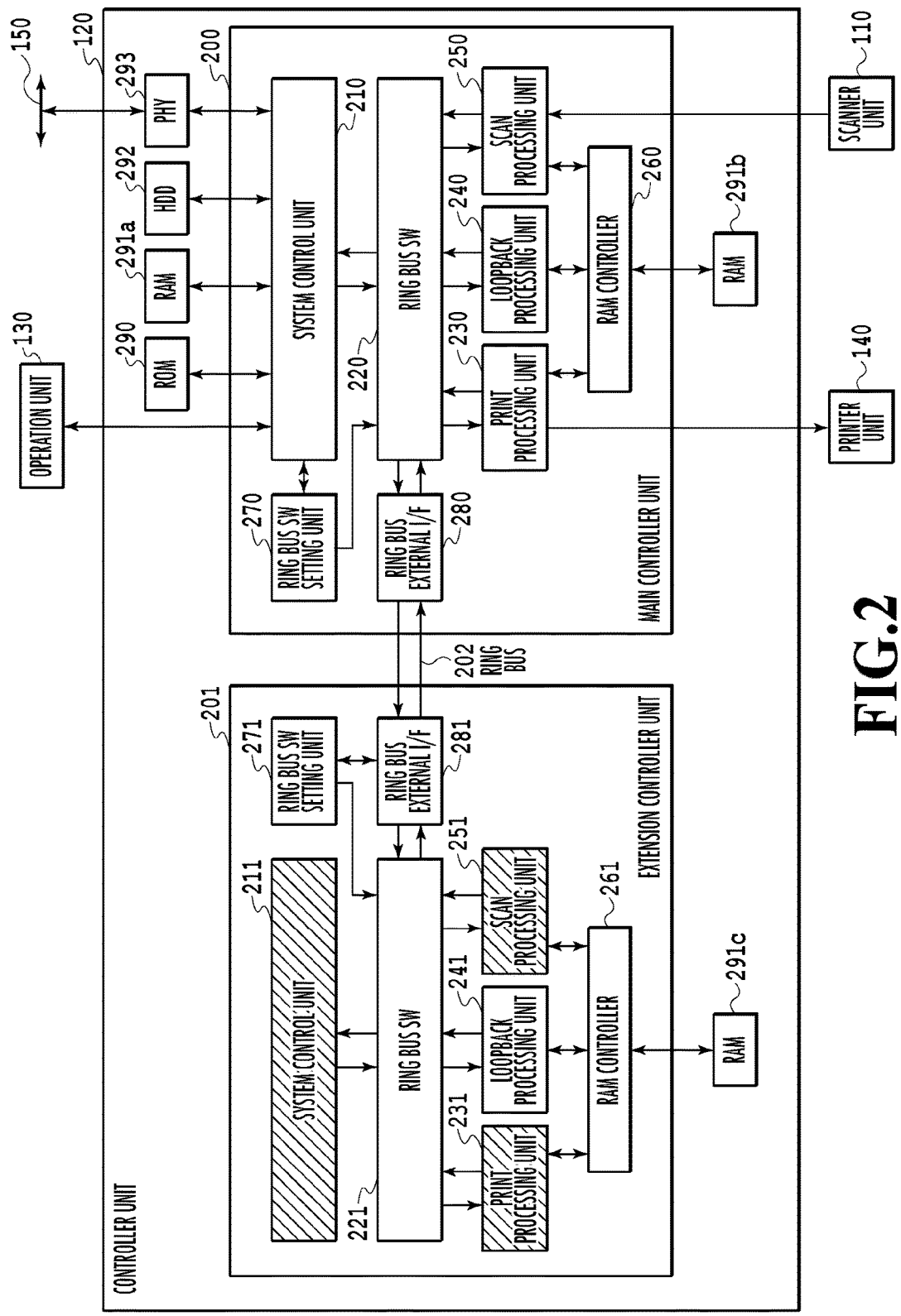
FIG. 2 is a block diagram showing an internal configuration of a controller unit according to a first embodiment.

FIG. 2 is a block diagram showing an internal configuration of the controller unit 120 according to the present embodiment. The controller unit 120 includes a main controller unit 200, an extension controller unit 201, a ring bus 202, a ROM 290, RAMs 291a to 291c, an HDD 292, and a PHY 293. In the following, each unit is explained in detail. In the present embodiment, it is assumed that the main controller unit 200 and the extension controller unit 201 are each an electronic circuit board (semiconductor integrated circuit), such as a printed board, independent of each other. Further, it is assumed that the extension controller unit 201 has a configuration that can be attached and detached so that a user can perform function extension. In the present embodiment, the configuration of the extension controller unit 201 is the same as the configuration of the main controller unit 200. However, as the function extension module, one having any function and configuration may be accepted as long as it has an interface capable connecting to the ring bus 202 and transmitting and receiving packet data. Further, it may also be possible to make up each of the main controller unit 200 and the extension controller unit 201 by, for example, an LSI integrated into one chip.

First, the main controller unit 200 is explained. The main controller unit 200 includes a system control unit 210, a ring bus switch 220, a print processing unit 230, a loopback processing unit 240, a scan processing unit 250, a RAM controller 260, a ring bus switch setting unit 270, and a ring bus external interface 280. The system control unit 210 is a control module that controls scan processing in the scanner unit 110 and print processing in the printer unit 140. The system control unit 210 is connected with the ring bus switch 220 by the ring bus 202. Further, the system control unit 210 performs transfer control of image data that is used in the above-described scan processing and print processing via the ring bus switch 220. Furthermore, the system control unit 210 controls the entire system in a centralized fashion, such as data transmission to the network 150, data reception from the network 150, and display processing for the operation unit 130.

The ring bus switch 220 performs switch control of the ring bus 202 to transfer image data to each module within the controller unit 120. In the present embodiment, the ring bus 202 to transfer image data to each module within the controller unit 120 is connected in the form of a ring via the ring bus switch 220. Due to this, it is made possible to transmit and receive data between the system control unit 210, the print processing unit 230, the loopback processing unit 240, the scan processing unit 250, and the ring bus external interface 280. The control of the ring bus switch 220 is performed by the ring bus switch setting unit 270 and it is possible to change the connection destination of each module located on the ring bus 202 in accordance with the necessity. Details of the switch control will be described later.

The print processing unit 230 performs print image processing, such as color space conversion processing, halftone processing, and gamma correction processing, for image data to be used in the printer unit 140. The print processing unit 230 receives image data from the ring bus switch 220, performs the above-described print image processing for the image data, and outputs the image data after the processing to the printer unit 140.

The loopback processing unit 240 performs image processing of an editing system having a possibility of being made use of both in the print processing and in the scan processing. Specifically, the loopback processing unit 240 performs scaling processing, image combination processing, rotation processing, and so on. The loopback processing unit 240 receives image data from the system control unit 210 via the ring bus 202, performs the above-described image processing of the editing system, and returns the image data after the processing to the system control unit 210 via the ring bus 202.

The scan processing unit 250 performs scanner image processing, such as shading correction processing, MTF correction processing, gamma correction processing, and filter processing, for the image data acquired by the scanner unit 110. The scan processing unit 250 performs scanner image processing for the image data transferred from the scanner unit 110 and transfers the image data after the processing to the ring bus switch 220. The image data transferred to the ring bus switch 220 is transferred to the system control unit 210 via the ring bus 202.

The RAM controller 260 performs processing to write image data received from the print processing unit 230, the loopback processing unit 240, and the scan processing unit 250 to the RAM 291b and processing to read and transfer image data written to the RAM 291b. The print processing unit 230, the loopback processing unit 240, and the scan processing unit 250 make use of the RAM 291b as a temporary image buffer to perform image processing to be performed by each of them. Further, at this time, on the transfer path between the RAM controller 260 and the RAM 291b, each piece of image data of the print processing unit 230, the loopback processing unit 240, and the scan processing unit 250 is transmitted and received in a multiplexed manner. Because of this, in the case where a request for data transfer exceeding the processing performance (memory bandwidth performance) of this transfer path is made, a state where transfer is postponed occurs. Consequently, the case where data transfer between the RAM controller 260 and the RAM 291b causes a bottleneck of the processing performance of the main controller unit 200 occurs frequently.

The ring bus external interface 280 is an interface that inputs and outputs packet data. The ring bus external interface 280 connects the main controller unit 200 and the outside via the ring bus with the ring bus switch 220 as its center. Via this ring bus external interface 280, data transfer is performed between the main controller unit 200 and the extension controller unit 201. That is, in the present embodiment, the extension controller unit 201 is connected with the main controller unit 200 via the ring bus external interface 280 and forms the one ring bus 202.

Next, the extension controller unit 201 is explained. The extension controller unit 201 is a function extension module to increase the speed of the processing of the controller unit 120. As described above, in the present embodiment, the configuration of the extension controller unit 201 is the same as the configuration of the main controller unit 200. That is, the extension controller unit 201 includes a system control unit 211, a ring bus switch 221, a print processing unit 231, a loopback processing unit 241, a scan processing unit 251, a RAM controller 261, a ring bus switch setting unit 271, and a ring bus external interface 281. The function of each unit is the same as the function of each corresponding unit within the main controller unit 200. By employing such a configuration, it is possible to suppress the development cost to design the extension controller unit 201 separately from the main controller unit 200. In the present embodiment, that which is used actually as the extension function among the print processing unit 231, the loopback processing unit 241, and the scan processing unit 251 within the extension controller unit 201 is the loopback processing unit 241. An aspect in which the print processing unit 231 or the scan processing unit 251 is used in place of the loopback processing unit 241 will be described later as a modification example. In FIG. 2, the system control unit 211, the print processing unit 231, and the scan processing unit 251 are shown in the shaded state, indicating that they do not need to be operated.

<System Control Unit>

Figure 3:
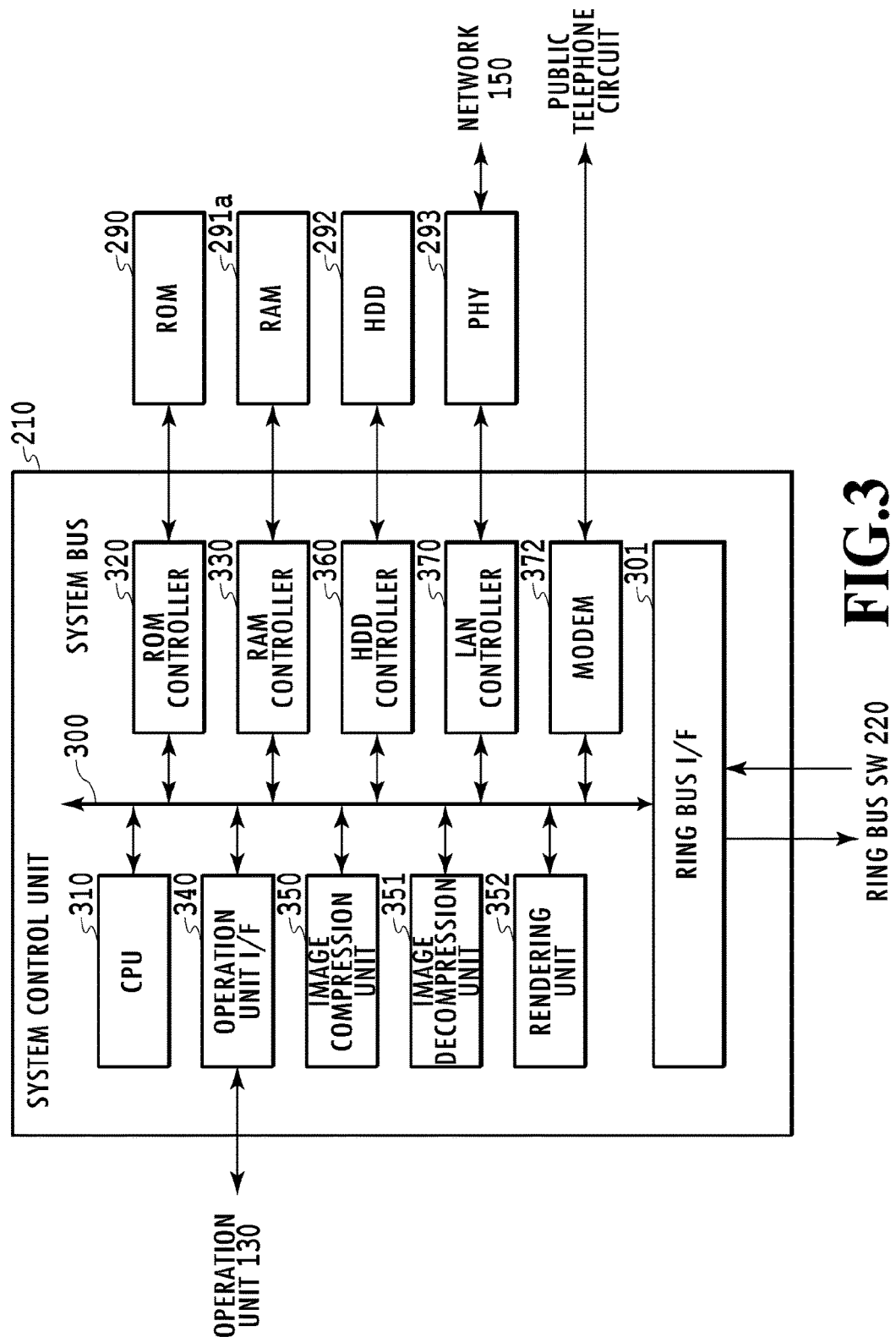
FIG. 3 is a block diagram showing an internal configuration of a system control unit according to the first embodiment.

FIG. 3 is a block diagram showing an internal configuration of the system control unit 210 according to the present embodiment. In the following, each component making up the system control unit 210 is explained. The system control unit 211 within the extension controller unit 201 has the same configuration.

A CPU 310 is a processor that controls the entire system. The CPU 310 provides centralized control of job processing, such as print processing and scan processing, in accordance with an OS and control programs loaded onto the RAM 291a. A ROM controller 320 is a control module to access the ROM 290 storing a boot program of the system. In the case where the power source of the image forming apparatus 100 is turned ON, the CPU 310 accesses the ROM 290 via the ROM controller 320 and the CPU 310 boots. A RAM controller 330 is a control module to access the RAM 291a storing the control programs and image data of the system. The RAM controller 330 includes a register to perform settings and control of the RAM 291a and it is possible to access the register from the CPU 310. An operation unit interface 340 controls a display of the reception and operation results of operation instructions as the results of a user operating the operation unit 130. The HDD 292 stores system software, application programs, image data, and page information and job information corresponding to each piece of image data. The HDD 292 is connected to the system bus 300 via an HDD controller 360 and writes and reads data in accordance with instructions of the CPU 310. A LAN controller 370 connects to the network 150 via the PHY 293 and inputs and outputs information, such as image data, with the external host computer. A modem 372 connects to a public telephone circuit, not shown schematically, and performs data communication with an external FAX device at the time of processing a FAX transmission job or a FAX reception job.

An image compression unit 350 performs compression processing to compress image data stored in the RAM 291a or the HDD 292 into a JPEG format. Further, an image decompression unit 351 performs decompression processing for image data compressed into a JPEG format. A rendering unit 352 converts image data (PDL data) received from the network 150 via the LAN controller 370 into bitmap data that the printer unit 140 can handle.

A ring bus interface 301 is an interface that connects a system bus 300 within the system control unit 210 and the ring bus 202 with the ring bus switch 220 outside the system control unit 210 as its center. Data that flows on the ring bus 202 is called packet data and the ring bus interface 301 transmits packet data stored in the RAM 291a or the HDD 292 to the ring bus 202. Further, the packet data received from the ring bus 202 is stored in the RAM 291a or the HDD 292.

<Packet Data>

Figure 4:
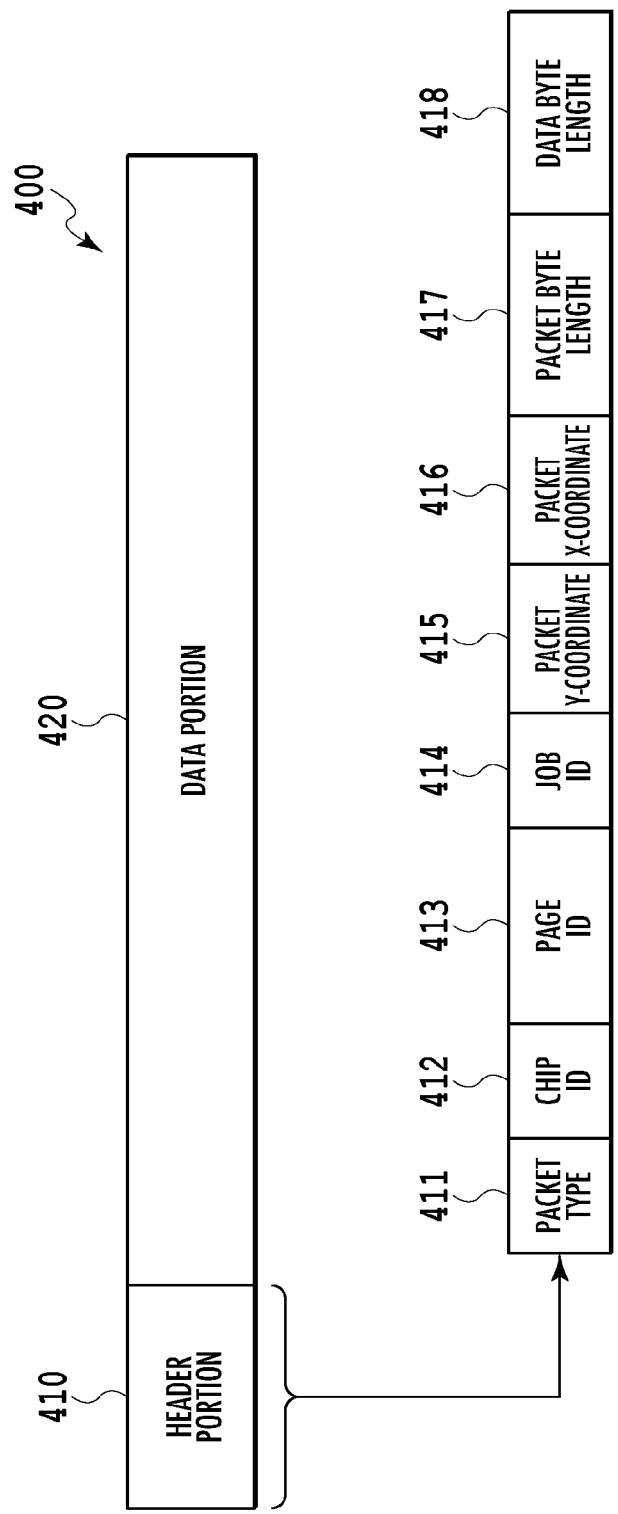
FIG. 4 is a diagram showing a structure of packet data.

Here, packet data is explained. FIG. 4 is a diagram showing a structure of packet data that flows on the ring bus 202. Packet data 400 includes a header portion 410 and a data portion 420. The header portion 410 further includes a packet type 411, a chip ID 412, a page ID 413, a job ID 414, a packet Y-coordinate 415, a packet X-coordinate 416, a packet byte length 417, and a data byte length 418.

The packet type 411 indicates whether the packet is image data or a command. In the case where the packet type 411 indicates image data, in the data portion 420, image data is stored. In the case where the packet type 411 indicates a command, in the data portion 420, a setting address and a setting value to set a coefficient, a mode, and so on of each image processing unit are stored. The chip ID 412 indicates an ID (identifier) to identify a processing unit that is the target to which the packet is transmitted. For example, an ID of "0" indicates the print processing unit 230, an ID of "1" indicates the loopback processing unit 240, an ID of "2" indicates the scan processing unit 250, an ID of "3" indicates the loopback processing unit 241 within the extension controller unit 201, and so on. The page ID 413 indicates a page number to which the packet belongs. There is a case where processing, such as scan processing and print processing, is performed for a plurality of pages and in this case, the page ID 413 indicates which page the packet belongs to. The job ID 414 indicates a job number to which the packet belongs. For example, in the case where a scan job and a print job are performed at the same time, to the packet of the scan job, "job number 1" is attached, to the packet of the print job, "job number 2" is attached, and so on, and it is made possible to identify each job. The packet Y-coordinate 415 indicates, in the case where image data is stored in the data portion 420, which Y-coordinate within the page the image data is located at. Further, the packet X-coordinate 416 indicates, in the case where image data is stored in the data portion 420, which X-coordinate within the page the image data is located at. The image data that is stored in the data portion 420 is obtained by dividing image data for each page into image data of a rectangular size of a predetermined number of pixels (e.g., 32 pixels×32 pixels). Consequently, in the case where the page data is regenerated from the packet data, the data of the Y-coordinate and the X-coordinate is referred to. This image data has been compressed by the image compression unit 350 or a compressor installed inside each image processing unit and is stored in the data portion 420 as compressed image data. The packet byte length 417 indicates a total number of bytes of the packet and the data byte length 418 indicates a total number of bytes of the data portion 420.

The packet data such as explained above flows on the ring bus 202. Each image processing unit receives and interprets the packet data and in the case where the packet is one indicating a command, sets a mode, a coefficient, and so on of the processing, and in the case where the packet is one indicating image data, performs image processing for the image data.

Following the above, the print processing unit 230, the loopback processing unit 240, and the scan processing unit 250 are explained in detail with reference to FIGS. 5A to 5C.
<Print Processing Unit>

Figure 5C:
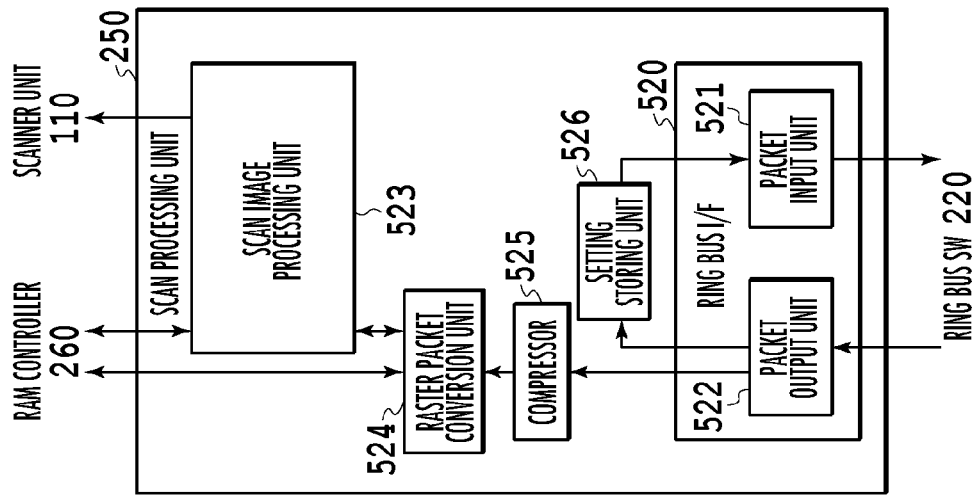
FIG. 5A to FIG. 5C are each a block diagram showing an internal configuration of each image processing module.
Figure 5B:
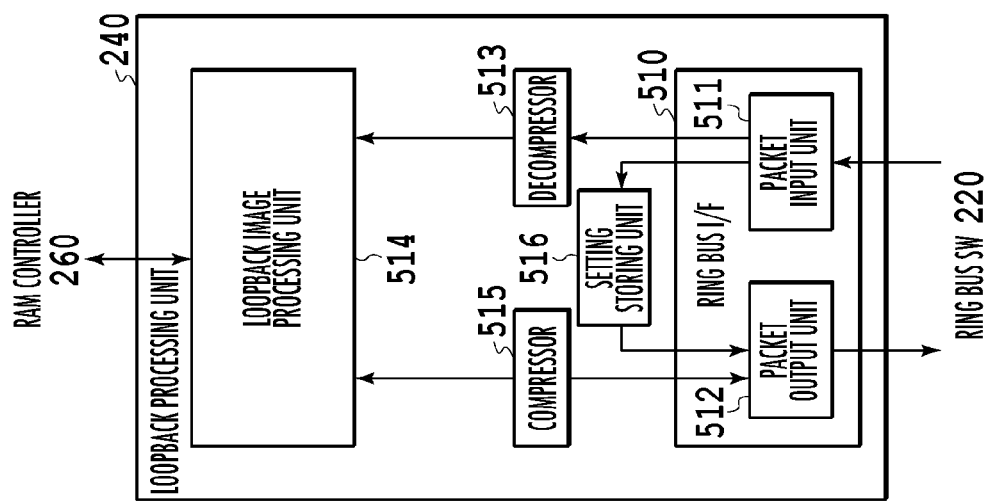
Figure 5A:
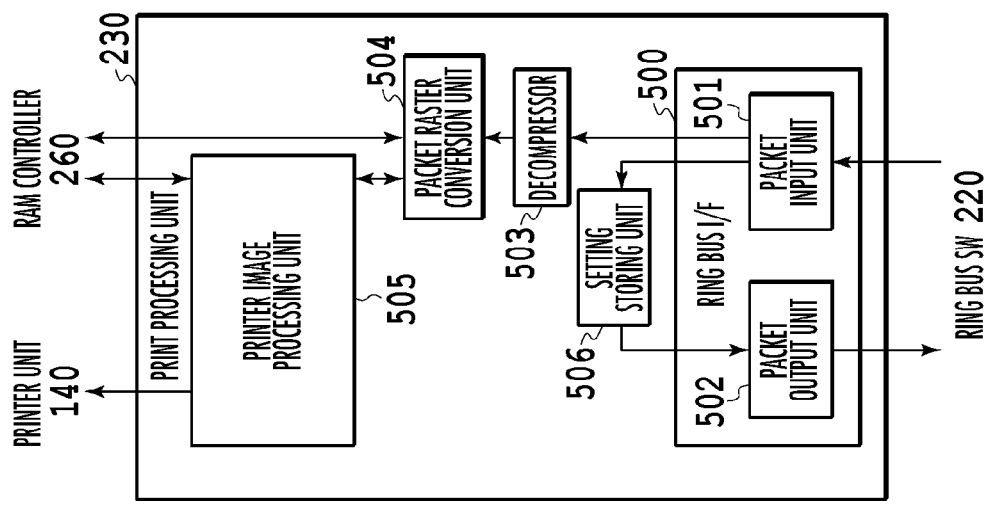

FIG. 5A is a diagram showing an internal structure of the print processing unit 230. A ring bus interface 500 is an interface that connects each unit within the print processing unit 230 and the ring bus 202 with the ring bus switch 220 outside the print processing unit 230 as its center. The ring bus interface 500 includes a packet input unit 501 and a packet output unit 502. Upon receipt of packet data, the packet input unit 501 refers to the chip ID 412 of the header portion 410 and checks whether the ID indicated by the chip ID 412 is the same as the chip ID allocated to the packet input unit 501 itself. In the case where the ID indicated by the chip ID 412 is different from the chip ID allocated to the packet input unit 501 itself, the packet input unit 501 determines that the packet data is not packet data that the packet input unit 501 itself should process and transfers the packet data to the packet output unit 502. On the other hand, in the case where the ID indicated by the chip ID 412 is the same as the chip ID allocated to the packet input unit 501 itself, image processing is performed through an internal image processing path (decompressor 503 to printer image processing unit 505) on a condition that the packet is image data. Further, in the case where the packet is a command, the setting address and the setting value stored in the data portion 420 are referred to and the coefficient and the mode of the specified image processing unit are set to a setting storing unit 506. In the case where the packet is a command to read the setting value, the setting storing unit 506 sends packet data storing the setting value to the ring bus interface 500. The decompressor 503, the packet raster conversion unit 504, and the printer image processing unit 505 perform processing based on the setting value held in the setting storing unit 506.

The packet output unit 502 performs arbitration for the packet data transferred from the packet input unit 501 and the packet data from the setting storing unit 506 and transfers the packet data to the ring bus 202. The decompressor 503 decompresses the compressed image data received from the ring bus interface 500 and restores the state where image processing in the post stage can be performed. The packet raster conversion unit 504 receives the decompressed image data from the decompressor 503 and converts the decompressed image data into raster image data. As described previously, the image data within a packet is data in units of squares of 32 pixels×32 pixels. In the case of an electrophotographic image forming apparatus, the printing processing within the printer unit 140 is performed in the raster order (line order), and therefore, the arrangement of the pixels of the image data is converted into the raster order in this packet raster conversion unit 504. Further, in the present embodiment, as a temporary buffer to convert the image data from the square of 32 pixels×32 pixels into the raster order, the RAM 291b is used, and therefore, the packet raster conversion unit 504 accesses the RAM 291b via the RAM controller 260.

The printer image processing unit 505 receives the image data converted into the raster order from the packet raster conversion unit 504 and performs image processing as preprocessing of printing in the printer unit 140 for the image data. Specifically, the image processing is the color space conversion processing to convert RGB into CMYK, the halftone processing by the dither method or the error diffusion method, the gamma correction processing to correct gradation in accordance with the characteristics of the printer unit 140, and so on. The image data for which the image processing has been performed is output to the printer unit 140. Further, it is necessary for the printer image processing unit 505 to output the image data to the printer unit 140 in accordance with the timing of activation of the printer unit 140 and the timing of sheet feed from the sheet feed unit 142. Consequently, via the RAM controller 260, the printer image processing unit 505 temporarily writes the image data to the RAM 291b as a buffer that is used until the timing is reached. Then, the printer image processing unit 505 reads the image data from the RAM 291b in synchronization with the sheet feed timing and outputs the image data to the printer unit 140.
<Loopback Processing Unit>

FIG. 5B is a diagram showing an internal structure of the loopback processing unit 240. A ring bus interface 510 is an interface that connects each unit within the loopback processing unit 240 and the ring bus 202 with the ring bus switch 220 outside the loopback processing unit 240 as its center. The ring bus interface 510 includes a packet input unit 511 and a packet output unit 512. Upon receipt of packet data, the packet input unit 511 refers to the chip ID 412 of the header portion 410 and checks whether the ID indicted by the chip ID 412 is the same as the chip ID allocated to the packet input unit 511 itself. In the case where the ID indicated by the chip ID 412 is different from the chip ID allocated to the packet input unit 511 itself, the packet input unit 511 determines that the packet data is not packet data that the packet input unit 511 itself should process and transfers the packet data to the packet output unit 512. On the other hand, in the case where the ID indicated by the chip ID 412 is the same as the chip ID allocated to the packet input unit 511 itself, image processing is performed through an internal image processing path (decompressor 513 to loopback image processing unit 514) on a condition that the packet is image data. Then, upon receipt of the compressed image data after the image processing from a compressor 515, the ring bus interface 510 attaches a header to the image data, shapes the image data as packet data, and transmits the packet data to the system control unit 210. Further, in the case where the packet is a command, the setting address and the setting value stored in the data portion 420 are referred to and the coefficient and the mode of the specified image processing unit are set to a setting storing unit 516. Further, in the case where the packet is a command to read the setting value, the setting storing unit 516 sends the packet data storing the setting value to the ring bus interface 510. The decompressor 513, the loopback image processing unit 514, and the compressor 515 perform processing based on the setting value held in the setting storing unit 516.

The packet output unit 512 performs arbitration for the packet data transferred from the packet input unit 511, the packet data from the compressor 515, and the packet data from the setting storing unit 516 and transfers the packet data to the ring bus 202. Next, the decompressor 513 decompresses the compressed image data input from the ring bus interface 510 and restores the pixel state where the image processing in the post stage can be performed.

The compressor 515 compresses the image data input from the loopback image processing unit 514, for which the processing has already been performed, and outputs the image data to the ring bus interface 510 in the post stage. The compression processing is performed to shape the packet data in the ring bus interface 510.

The loopback image processing unit 514 receives image data from the decompressor 513 and performs the image processing of the editing system described previously. This function can be made use of both in the print processing and in the scan processing and the same function is used also in the extension controller unit 201.

<Scan Processing Unit>

FIG. 5C is a diagram showing an internal structure of the scan processing unit 250. A ring bus interface 520 is an interface that connects each unit within the scan processing unit 250 and the ring bus 202 with the ring bus switch 220 outside the scan processing unit 240 as its center. The ring bus interface 520 includes a packet input unit 521 and a packet output unit 522. Upon receipt of packet data, the packet input unit 521 refers to the chip ID 412 of the header portion 410 and checks whether the ID indicted by the chip ID 412 is the same as the chip ID allocated to the packet input unit 521 itself. In the case where the ID indicated by the chip ID 412 is different from the chip ID allocated to the packet input unit 521 itself, the packet input unit 521 determines that the packet data is not packet data that the packet input unit 521 itself should process and transfers the packet data to the packet output unit 522. On the other hand, in the case where the ID indicated by the chip ID 412 is the same as the chip ID allocated to the packet input unit 521 itself, the setting address and the setting value stored in the data portion 420 are referred to and the coefficient and the mode of the specified image processing unit are set to a setting storing unit 526 on a condition that the packet is a command. At this time, to the scan processing unit 250, image data is input only from the scanner unit 110, and therefore, it is unlikely that the received packet indicates image data. Further, in the case where the packet is a command to read the setting value, the setting storing unit 526 sends the packet data storing the setting value to the ring bus interface 520. A scan image processing unit 523, a raster packet conversion unit 524, and a compressor 525 perform processing based on the setting value held in the setting storing unit 526. The packet output unit 522 performs arbitration for the packet data transferred from the packet input unit 521 and the packet data from the setting storing unit 526 and transfers the packet data to the ring bus 202.

The compressor 525 compresses the image data input from the raster packet conversion unit 524 and outputs the image data to the ring bus interface 520 in the post stage. The compression processing is performed to shape the packet data in the ring bus interface 520.

The raster packet conversion unit 524 converts the image data input from the scan image processing unit 523 into image data of a square of 32 pixels×32 pixels. As described previously, the image data within the packet is in units of squares of 32 pixels×32 pixels, and therefore, conversion into a square is performed for packet transmission in the post stage.

The scan processing within the scanner unit 110 is performed in the raster order (line order) by using a line-type image sensor, and therefore, in the raster packet conversion unit 524, the arrangement of pixels of the image data is converted into a square. Further, in the present embodiment, as a temporary buffer to convert the image data from the raster order into a square of 32 pixels×32 pixels, the RAM 291$b$ is used, and therefore, the raster packet conversion unit 524 accesses the RAM 291$b$ via the RAM controller 260.

The scan image processing unit 523 receives image data from the scanner unit 110 and performs image processing, such as shading correction, MTF correction, input gamma correction, and filtering. The image data for which the image processing such as this has been performed is output to the raster packet conversion unit 524. Further, it is necessary for the scan image processing unit 523 to receive image data in accordance with the transfer speed of the input image data in order to prevent the scan operation of the scanner unit 110 from suspending. On the other hand, in the case where the timing of the packet transmission of each image processing unit overlaps the timing of the packet transmission of the ring bus interface 520 itself, there is a case where the packet transmission of the ring bus interface 520 is postponed, and therefore, the transmission speed is not stable. Consequently, the scan image processing unit 523 temporarily writes the image data to the RAM 291$b$ via the RAM controller 260 so as to use the RAM 291$b$ as an image buffer for temporary buffering until the transmission timing. Then, the scan image processing unit 523 reads the image data from the RAM 291$b$ in synchronization with the timing of packet transmission and transmits the image data to the raster packet conversion unit 524.

<Ring Bus Switch>

Figure 6:
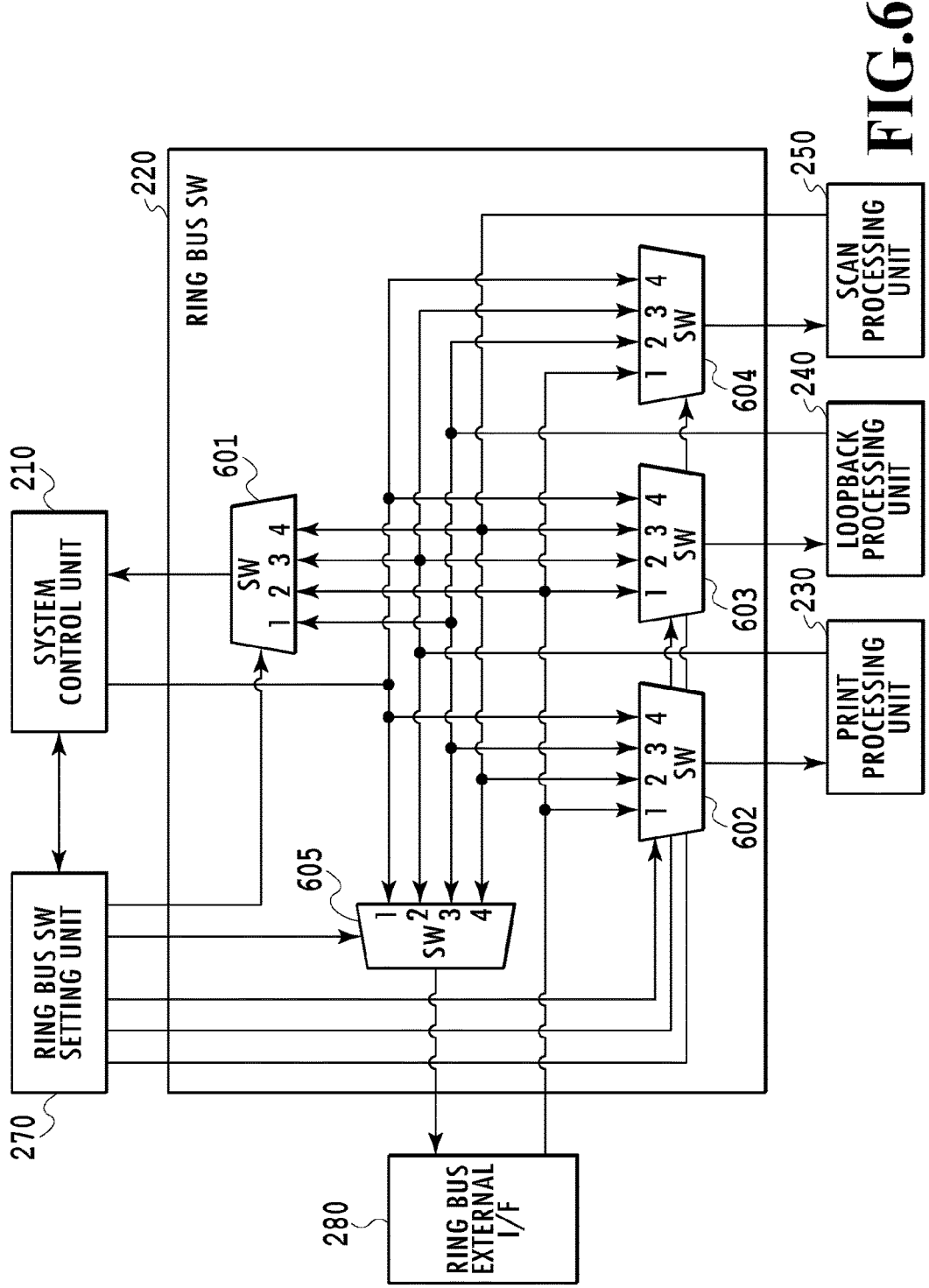
FIG. 6 is a block diagram showing an internal configuration of a ring bus switch according to the first embodiment.

FIG. 6 is a block diagram showing an internal configuration of the ring bus switch 220 within the main controller unit 200. The internal configuration of the ring bus switch 221 within the extension controller unit 201 is the same as this. The ring bus switch 220 internally has switches in the same number as the total number of modules that may be the transfer destination of data in the ring bus 202. In the present embodiment, the ring bus switch 220 has five switches 601 to 605 corresponding to each module of the system control unit 210, the print processing unit 230, the loopback processing unit 240, the scan processing unit 250, and the ring bus external interface 280. It is possible for each of the switches 601 to 605 to switch connection destinations in the ring bus 202 in accordance with a value (setting value) set by the ring bus switch setting unit 270. Due to this, it is possible to freely change the connection order on the ring bus 202 of each of the system control unit 210, the print processing unit 230, the loopback processing unit 240, the scan processing unit 250, and the ring bus external interface 280.

Figure 7:
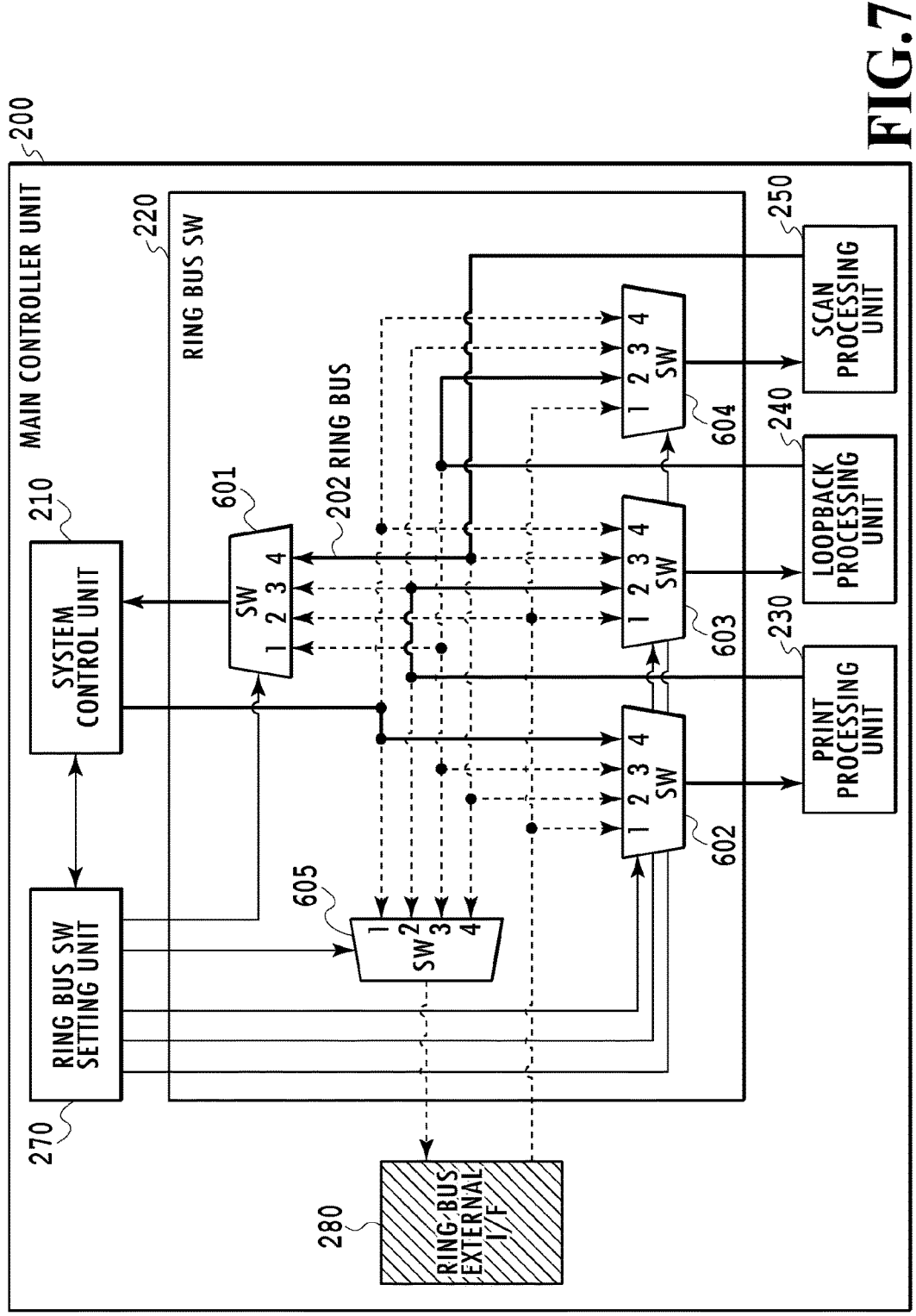
FIG. 7 is a diagram showing an example of connection control of a ring bus according to the first embodiment.
Figure 8:
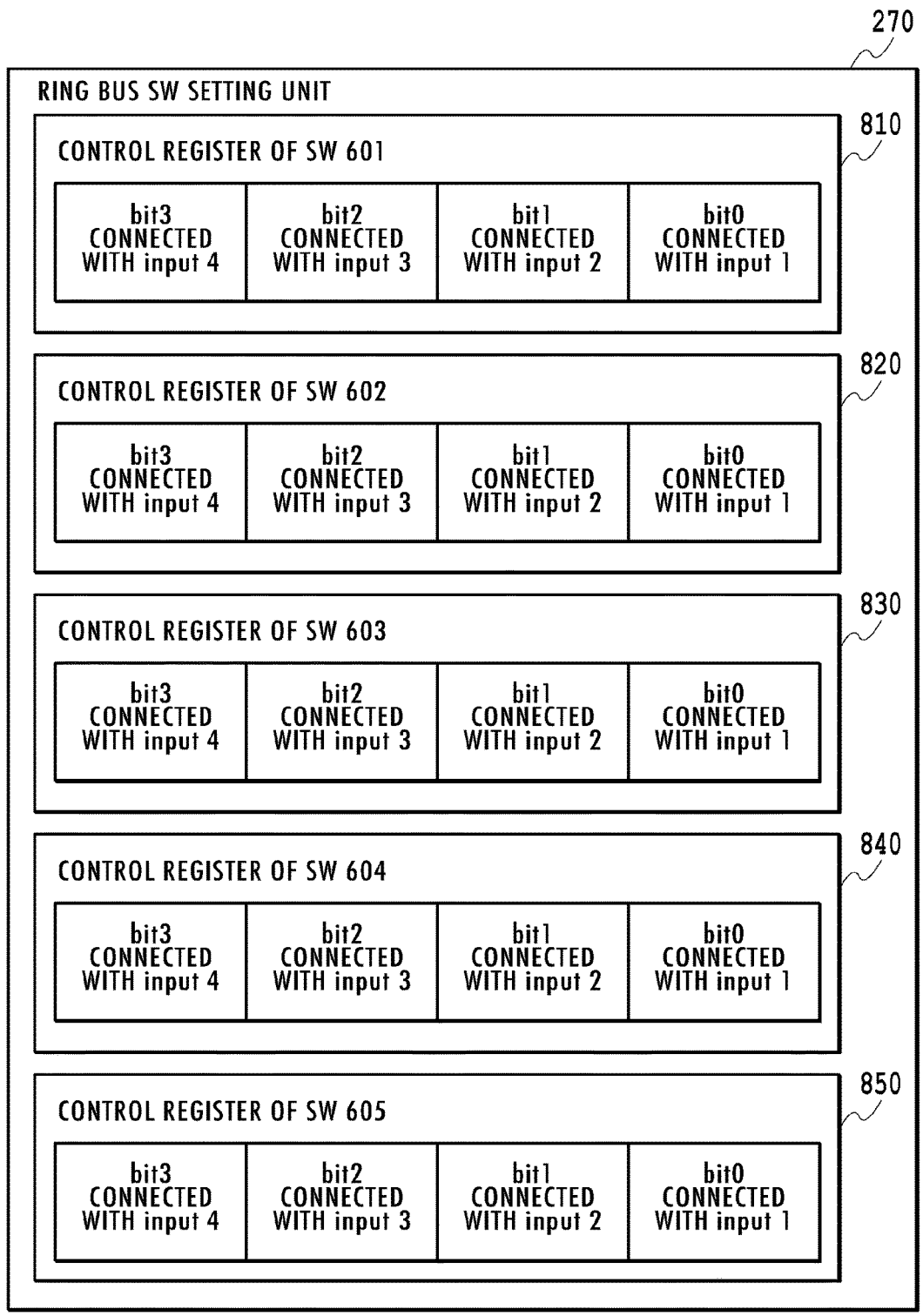
FIG. 8 is a diagram showing an internal configuration of a ring bus switch setting unit according to the first embodiment.

FIG. 7 is a diagram showing an example of connection control of the ring bus 202 by the ring bus switch 220 (or 221) and showing connection control in the case where the ring bus 202 is completed within the main controller unit 200. Then, FIG. 8 is a diagram showing an internal configuration of the ring bus switch setting unit 270. The ring bus switch setting unit 270 has registers (control registers) 810 to 850 to control the switches 601 to 605. Then, each of the control registers 810 to 850 of the present embodiment is made up of a 4-bit register and for example, in the case where "1" is set to "bit 0", "input 1" is connected with the output of the switch. Similarly, in the case where "1" is set to "bit 1", "input 2" is, in the case where "1" is set to "bit 2", "input 3" is, and in the case where "1" is set to "bit 3", "input 4" is connected to the output of the switch, respectively. As described above, depending on the value stored in each control register, the module that is the transfer destination of the input data in each switch is specified. The setting value (value of each control register) in the case where the connection control shown in FIG. 7 on the ring bus 202 is performed is as follows.

TABLE 1

| Control register value of switch 601 | 1000 |
| Control register value of switch 602 | 1000 |
| Control register value of switch 603 | 0010 |
| Control register value of switch 604 | 0010 |
| Control register value of switch 605 | 0000 |

That is, in case where the connection control in FIG. 7 is performed, the switch 601 outputs, in accordance with the setting value "1000", the packet data from the scan processing unit 250 corresponding to "input 4" to the system control unit 210. The switch 602 outputs, in accordance with the setting value "1000", the packet data from the system control unit 210 corresponding to "input 4" to the print processing unit 230. The switch 603 outputs, in accordance with the setting value "0010", the packet data from the print processing unit 230 corresponding to "input 2" to the loopback processing unit 240. The switch 604 outputs, in accordance with the setting value "0010", the packet data from the loopback processing unit 240 corresponding to "input 2" to the scan processing unit 250. The switch 605 outputs nothing in accordance with the setting value "0000" (the ring bus external interface 280 enters the unused state). By controlling the ring bus switch 220 in this manner, the packet data sequentially circulates, from the system control unit 210 as its starting point, through the print processing unit 230, the loopback processing unit 240, and the scan processing unit 250 and returns to the system control unit 210. Due to this, in the configuration including the main controller unit 200 alone, i.e., in the configuration in which the extension controller unit 201 is not connected, it is made possible to form the ideal ring bus 202 that takes into consideration the efficiency in the bandwidth inside the main controller unit 200.

Figure 9:
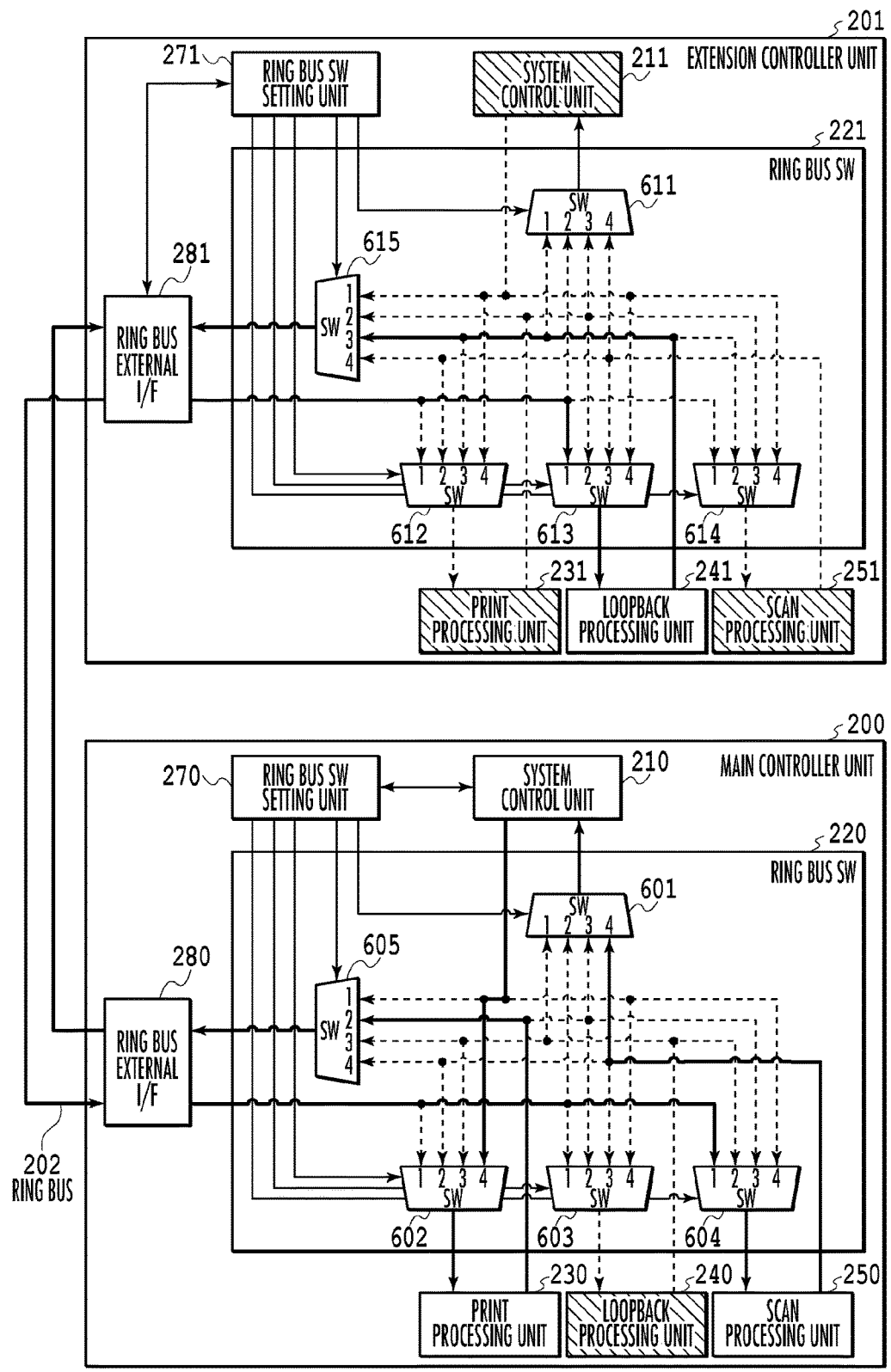
FIG. 9 is a diagram showing an example of connection control of a ring bus according to the first embodiment.

FIG. 9 shows connection control in the case where the main controller unit 200 and the extension controller unit 201 are connected to form the ring bus 202. The setting value (value of each control register) in the case where the connection control shown in FIG. 9 is performed is as follows.

TABLE 2

| Control register value of switch 601 | 1000 |
| Control register value of switch 602 | 1000 |
| Control register value of switch 603 | 0000 |
| Control register value of switch 604 | 0001 |
| Control register value of switch 605 | 0010 |
| Control register value of switch 611 | 0000 |
| Control register value of switch 612 | 0000 |
| Control register value of switch 613 | 0001 |
| Control register value of switch 614 | 0000 |
| Control register value of switch 615 | 0100 |

That is, in the case where the connection control in FIG. 9 is performed, the switch 601 outputs, in accordance with the setting value "1000", the packet data from the scan processing unit 250 corresponding to "input 4" to the system control unit 210. The switch 602 outputs, in accordance with the setting value "1000", the packet data from the system control unit 210 corresponding to "input 4" to the print processing unit 230. The switch 603 outputs nothing in accordance with the setting value "0000" (the loopback processing unit 240 enters the unused state). The switch 604 outputs, in accordance with the setting value "0001", the packet data from the ring bus external interface 280 corresponding to "input 1" to the scan processing unit 250. The switch 605 outputs, in accordance with the setting value "0010", the packet data from the print processing unit 230 corresponding to "input 2" to the ring bus external interface 280. By controlling the ring bus switch 220 in this manner, the packet data sequentially circulates, from the system control unit 210 as its starting point, through the print processing unit 230, the ring bus external interface 280, and the scan processing unit 250 and returns to the system control unit 210. By not using the loopback processing unit 240 within the main controller unit 200 in this manner, the congestion on the data transfer path to the RAM 291b is relaxed and it is made possible to prevent a reduction in performance of the main controller unit 200. Further, in the ring bus switch 221 of the extension controller unit 201, switches 611, 612, and 614 output nothing in accordance with the setting value "0000" (the system control unit 211, the print processing unit 231, and the scan processing unit 250 enter the unused state). A switch 613 outputs, in accordance with the setting value "0001", the packet data from the ring bus external interface 281 corresponding to "input 1" to the loopback processing unit 241. A switch 615 outputs, in accordance with the setting value "0100", the packet data from the loopback processing unit 241 corresponding to "input 3" to the ring bus external interface 281. By controlling the ring bus switch 221 in this manner, packet data that is input to the extension controller unit 201 circulates through the loopback processing unit 241 and returns to the main controller unit 200.

In the case also where the ring bus 202 is formed by the combination of the main controller unit 200 and the extension controller unit 201, by performing the connection control as shown in FIG. 9, it is possible to implement the same connection order as that in the case where the ring bus 202 is made up of the main controller unit 200 alone. That is, it is made possible to form one ring bus with high bandwidth efficiency in which the packet data sequentially circulates, from the system control unit 210 as its starting point, through the print processing unit 230, the loopback processing unit 241, and the scan processing unit 250 and returns to the system control unit 210.

In the present embodiment, it is assumed that the above-described setting value is a fixed value and the value is settled before the ring bus 202 is caused to operate. However, the configuration is only required to be capable of settling the value before causing the ring bus 202 to operate and the configuration may be one in which it is possible to change the setting from the outside of the main controller unit 200 and the extension controller unit 201. For example, the configuration may be one in which it is possible for a user to set a new value via the operation unit 130 by using software capable of editing the above-described control register value. At this time, the CPU 310 of the system control unit 210 executes the above-described software and the system control unit 211 of the extension controller unit 201 is not used. Because of this, the change of the control register value in the ring bus switch setting unit 271 of the extension controller unit 201 is also performed by the system control unit 210 of the main controller unit 200 via the ring bus external interfaces 280 and 281.

First Modification Example

In the example in FIG. 9 described above, the loopback processing unit 240 within the main controller unit 200 is not used but the loopback processing unit 241 within the extension controller unit 201 is used. Next, an aspect is explained as a first modification example in which the print processing unit 230 within the main controller unit 200 is not used but the print processing unit 231 within the extension controller unit 201 is used. The first modification example differs from the above-described embodiment in the settings of the ring bus switches 220 and 221 within the main controller unit 200 and the extension controller unit 201 and the connection destination of the printer unit 140. In the following, detailed explanation is given with reference to the drawings.
<Controller Unit>

Figure 10:
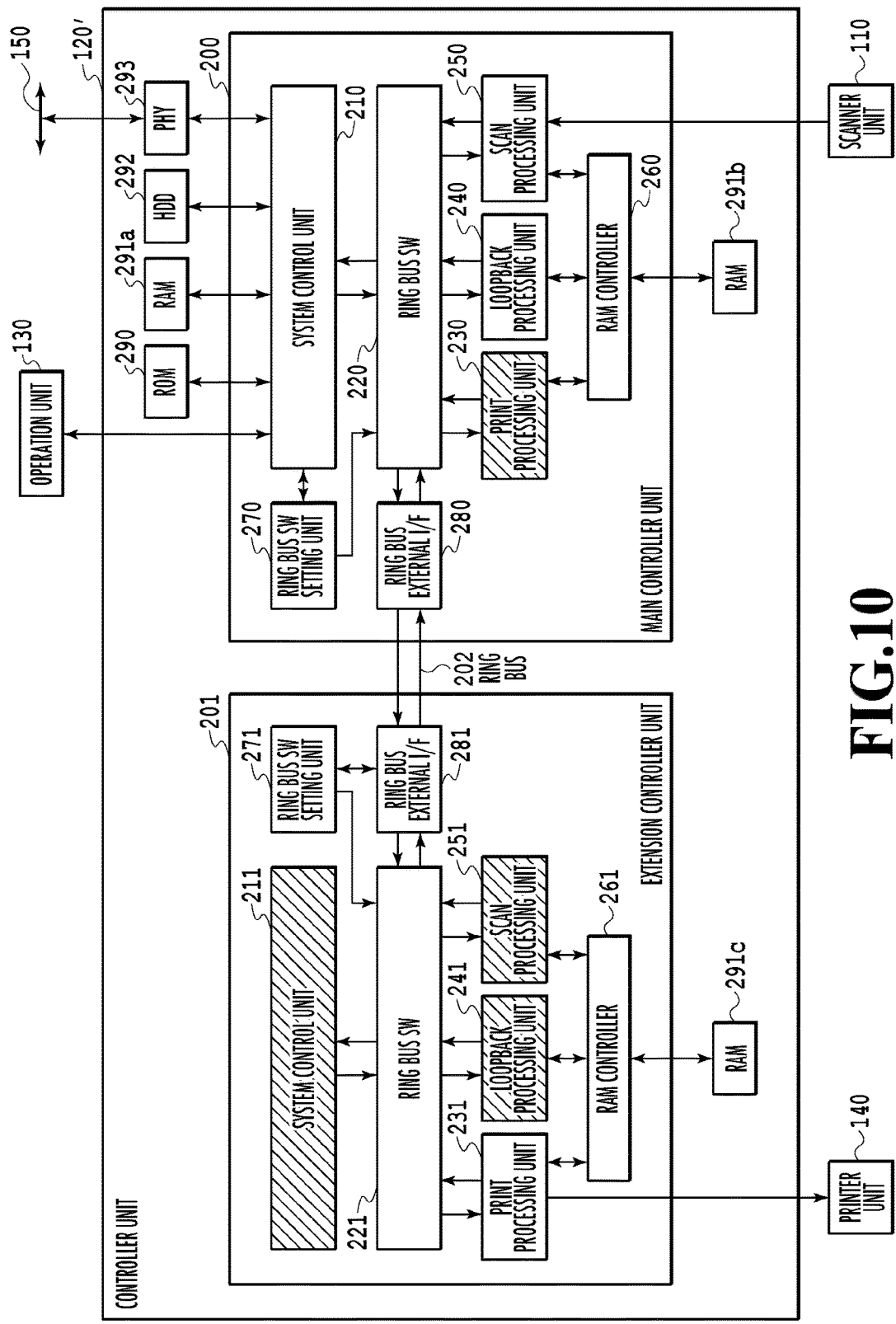
FIG. 10 is a block diagram showing an internal configuration of a controller unit according to a first modification example.

FIG. 10 is a block diagram showing an internal configuration of a controller unit 120' according to the present modification example. The configuration of the controller unit 120' is the same as that of the controller unit 120 shown in FIG. 2. That is, the controller unit 120' includes the main controller unit 200, the extension controller unit 201, the ring bus 202, the ROM 290, the RAMs 291a to 291c, the HDD 292, and the PHY 293. In the present modification example, image data is output from the print processing unit 231 of the extension controller unit 201 to the printer unit 140, and therefore, the printer unit 140 is connected to the extension controller unit 201. In FIG. 10, the gray-out displayed modules, i.e., the print processing unit 230, the system control unit 211, the loopback processing unit 241, and the scan processing unit 251, represent modules that do not need to be operated in the present modification example.
<Ring Bus Switch Control>

Figure 11:
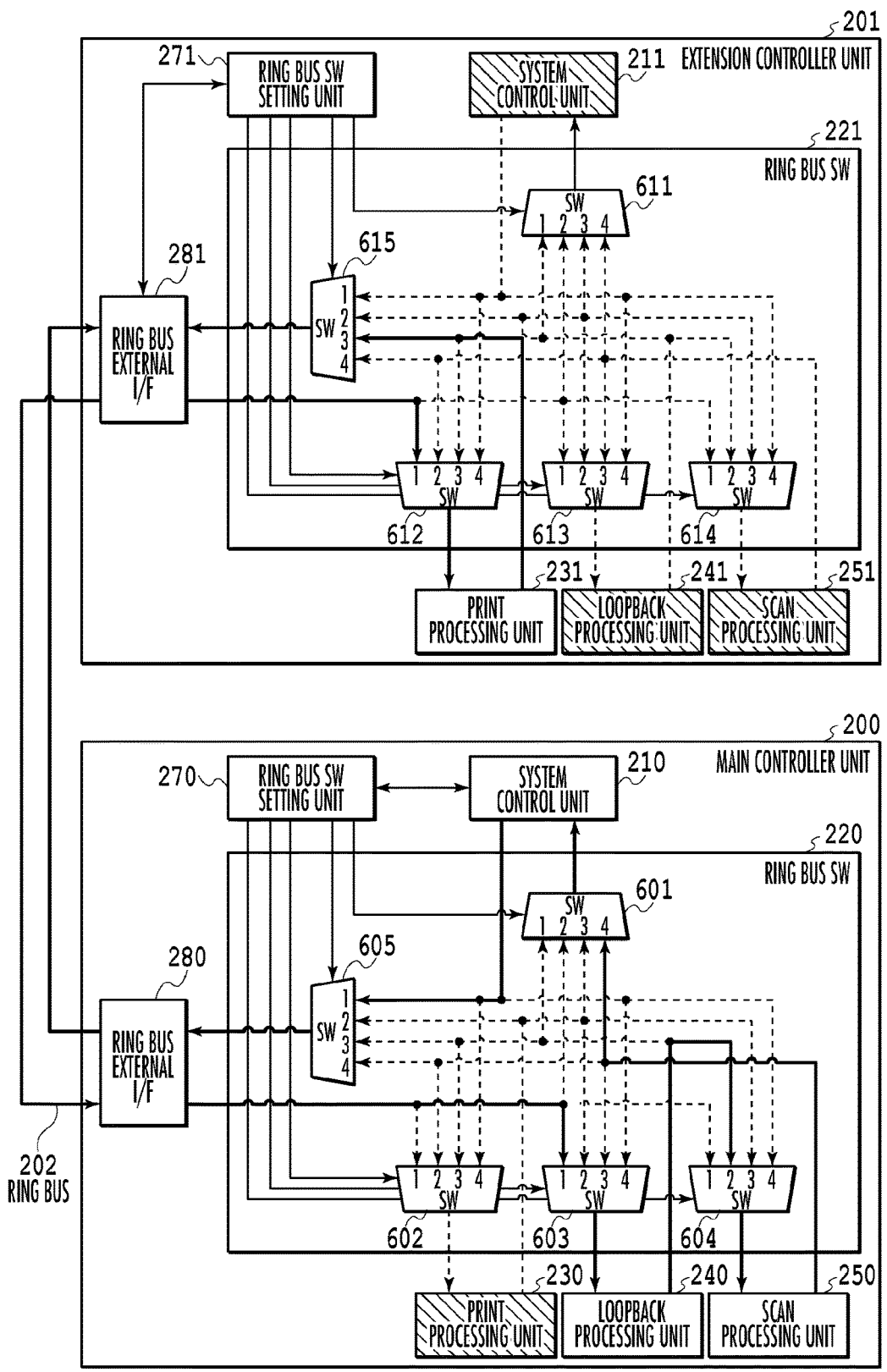
FIG. 11 is a diagram showing an example of connection control of a ring bus according to the first modification example.

FIG. 11 shows connection control in the case where the main controller unit 200 and the extension controller unit 201 are connected to form the ring bus 202 according to the present modification example. By the ring bus switch 220 of the main controller unit 200, the switch 601 is controlled so as to output the packet data from the scan processing unit 250 to the system control unit 210. The switch 602 is controlled so as to receive no packet data and to output nothing. The switch 603 is controlled so as to output the packet data from the ring bus external interface 280 to the loopback processing unit 240. The switch 604 is controlled so as to output the packet data from the loopback processing unit 240 to the scan processing unit 250. The switch 605 is controlled so as to output the packet data from the system control unit 210 to the ring bus external interface 280. By controlling the ring bus switch 220 in this manner, the packet data sequentially circulates, from the system control unit 210 as its starting point, through the ring bus external interface 280, the loopback processing unit 240, and the scan processing unit 250 and returns to the system control unit 210. By not using the print processing unit 230 within the main controller unit 200 in this manner, the congestion on the data transfer path to the RAM 291b is relaxed and it is made possible to prevent a reduction in performance of the main controller unit 200.

Further, by the ring bus switch 221 of the extension controller unit 201, the switches 611, 613, and 614 are controlled so as to receive no packet data and to output nothing. The switch 612 is controlled so as to output the packet data from the ring bus external interface 281 to the print processing unit 231. The switch 615 is controlled so as to output the packet data from the print processing unit 231 to the ring bus external interface 281. By controlling the ring bus switch 221 in this manner, the packet data that is input to the extension controller unit 201 circulates through the print processing unit 231 and returns to the main controller unit 200.

According to the present modification example, it is possible to form the ring bus 202 in which the packet data sequentially circulates, from the system control unit 210 as its starting point, through the print processing unit 231, the loopback processing unit 240, and the scan processing unit 250 and returns to the system control unit 210.

Second Modification Example

Following the above, an aspect is explained as a second modification example in which the scan processing unit 250 within the main controller unit 200 is not used but the scan processing unit 251 within the extension controller unit 201 is used. The second modification example differs from the above-described embodiment in the settings of the ring bus switches 220 and 221 within the main controller unit 200 and the extension controller unit 201 and the connection destination of the scanner unit 110. In the following, detailed explanation is given with reference to the drawings.
<Controller Unit>

Figure 12:
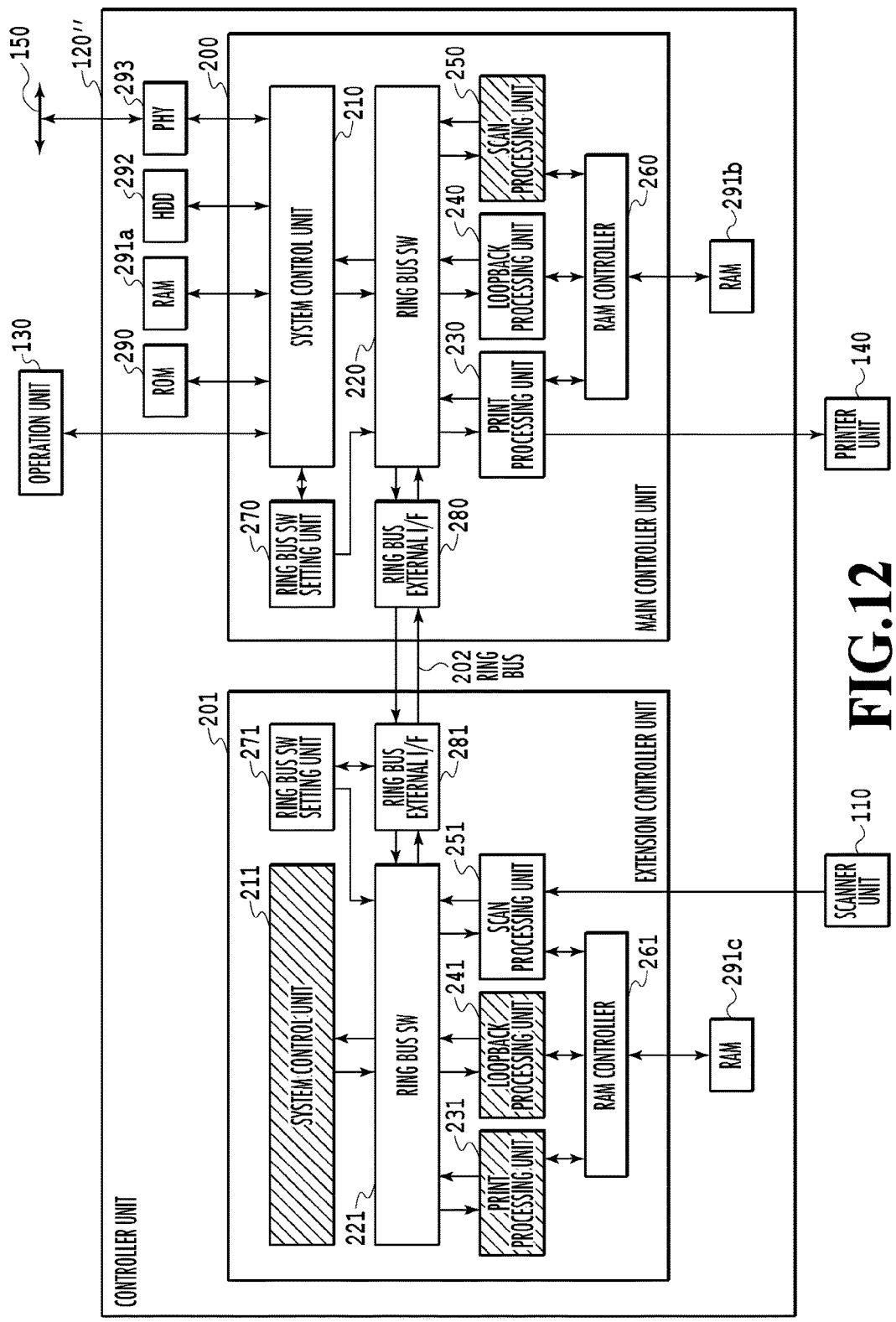
FIG. 12 is a block diagram showing an internal configuration of a controller unit according to a second modification example.

FIG. 12 is a block diagram showing an internal configuration of a controller unit 120" according to the present modification example. The configuration of the controller unit 120" is also the same as that of the controller unit 120 shown in FIG. 2. That is, the controller unit 120" includes the main controller unit 200, the extension controller unit 201, the ring bus 202, the ROM 290, the RAMs 291a to 291c, the HDD 292, and the PHY 293. In the present modification example, image data is output from the scan processing unit 251 of the extension controller unit 201 to the scanner unit 110, and therefore, the scanner unit 110 is connected to the extension controller unit 201. In FIG. 12, the modules shown in the shaded state, i.e., the print processing unit 231, the system control unit 211, the loopback processing unit 241, and the scan processing unit 250, represent modules that do not need to be operated in the present modification example.

<Ring Bus Switch Control>

Figure 13:
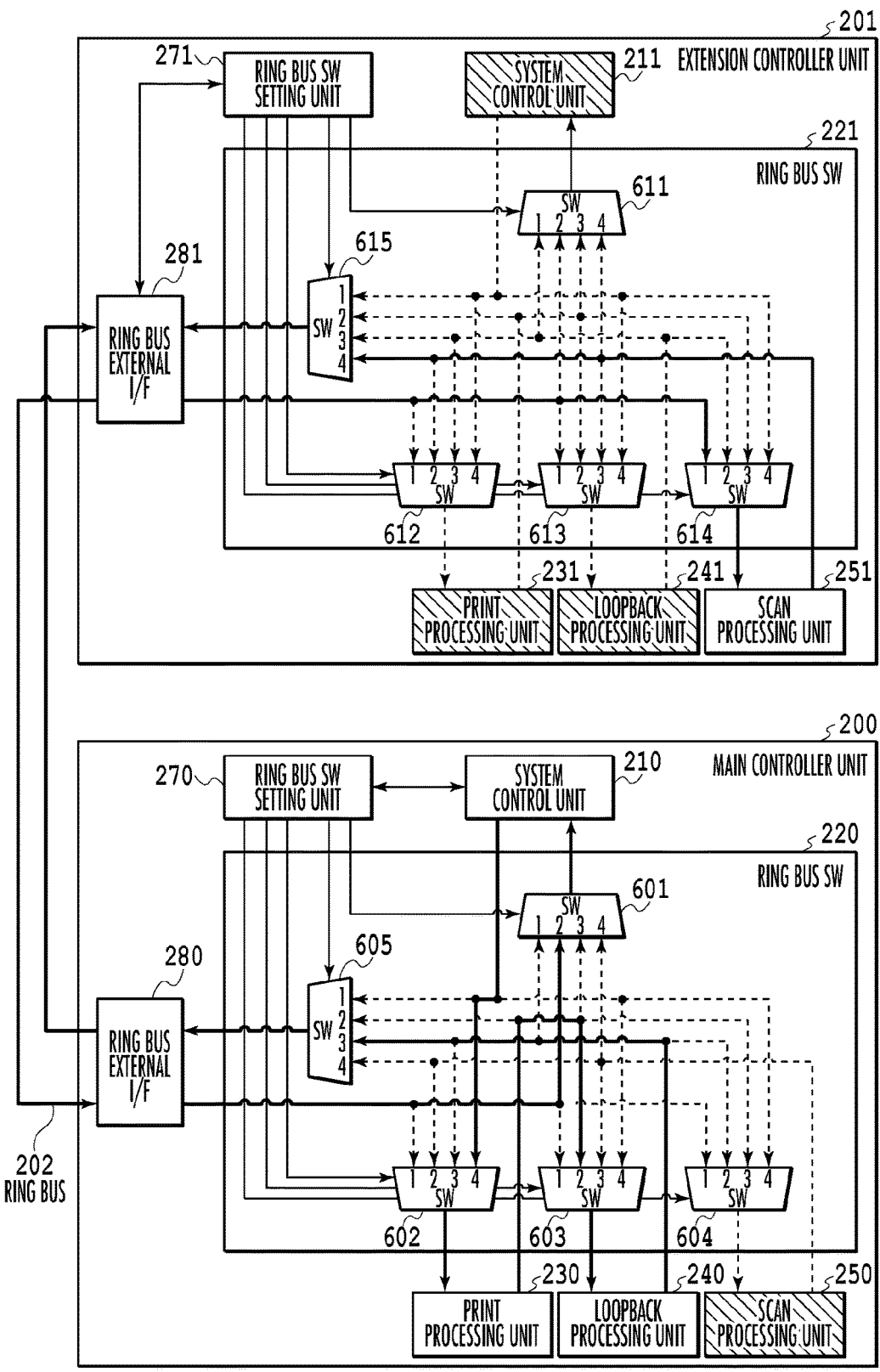
FIG. 13 is a diagram showing an example of connection control of a ring bus according to the second modification example.

FIG. 13 shows connection control in the case where the main controller unit 200 and the extension controller unit 201 are connected to form the ring bus 202 according to the present modification example.

By the ring bus switch 220 of the main controller unit 200, the switch 601 is controlled so as to output the packet data from the ring bus external interface 280 to the system control unit 210. The switch 602 is controlled so as to output the packet data from the system control unit 210 to the print processing unit 230. The switch 603 is controlled so as to output the packet data from the print processing unit 230 to the loopback processing unit 240. The switch 604 is controlled so as to receive no packet data and to output nothing. The switch 605 is controlled so as to output the packet data from the loopback processing unit 240 to the ring bus external interface 280. By controlling the ring bus switch 220 in this manner, the packet data sequentially circulates, from the system control unit 210 as its starting point, through the ring bus external interface 280, the print processing unit 230, and the loopback processing unit 240 and returns to the system control unit 210. By not using the scan processing unit 250 within the main controller unit 200 in this manner, the congestion on the data transfer path to the RAM 291b is relaxed and it is made possible to prevent a reduction in performance of the main controller unit 200.

Further, by the ring bus switch 221 of the extension controller unit 201, the switches 611, 612, and 613 are controlled so as to receive no packet data and to output nothing. The switch 614 is controlled so as to output the packet data from the ring bus external interface 281 to the scan processing unit 251. The switch 615 is controlled so as to output the packet data from the scan processing unit 251 to the ring bus external interface 281. By controlling the ring bus switch 221 in this manner, the packet data that is input to the extension controller unit 201 circulates through the scan processing unit 251 and returns to the main controller unit 200.

According to the present modification example, it is made possible to form the ring bus 202 in which the packet data sequentially circulates, from the system control unit 210 as its starting point, through the print processing unit 230, the loopback processing unit 240, and the scan processing unit 251 and returns to the system control unit 210.

In the present embodiment including the above-described two modification examples, the configuration of the extension controller unit 201 is the same as the configuration of the main controller unit 200, but a configuration part of which is different may also be accepted. Further, in the present embodiment, the configuration is such that each of the main controller unit 200 and the extension controller unit 201 includes the ring bus switch setting units 270 and 271, but the configuration is not limited to this. For example, a configuration may also be accepted in which one common ring bus switch setting unit performs the switch control of both the ring bus switches 220 and 221.

According to the present embodiment, in the case where a function extension module is added, it is made possible to connect each image processing module on the ring bus in an efficient order that takes the bandwidth into consideration.

Second Embodiment

In the first embodiment, the number of ring bus external interface modules possessed by each controller unit (each board) is one. Next, an aspect is explained as a second embodiment in which there are two ring bus external interface modules on each board. In the following, points different from the first embodiment are explained mainly.

<Controller Unit>

Figures 14, 14A:
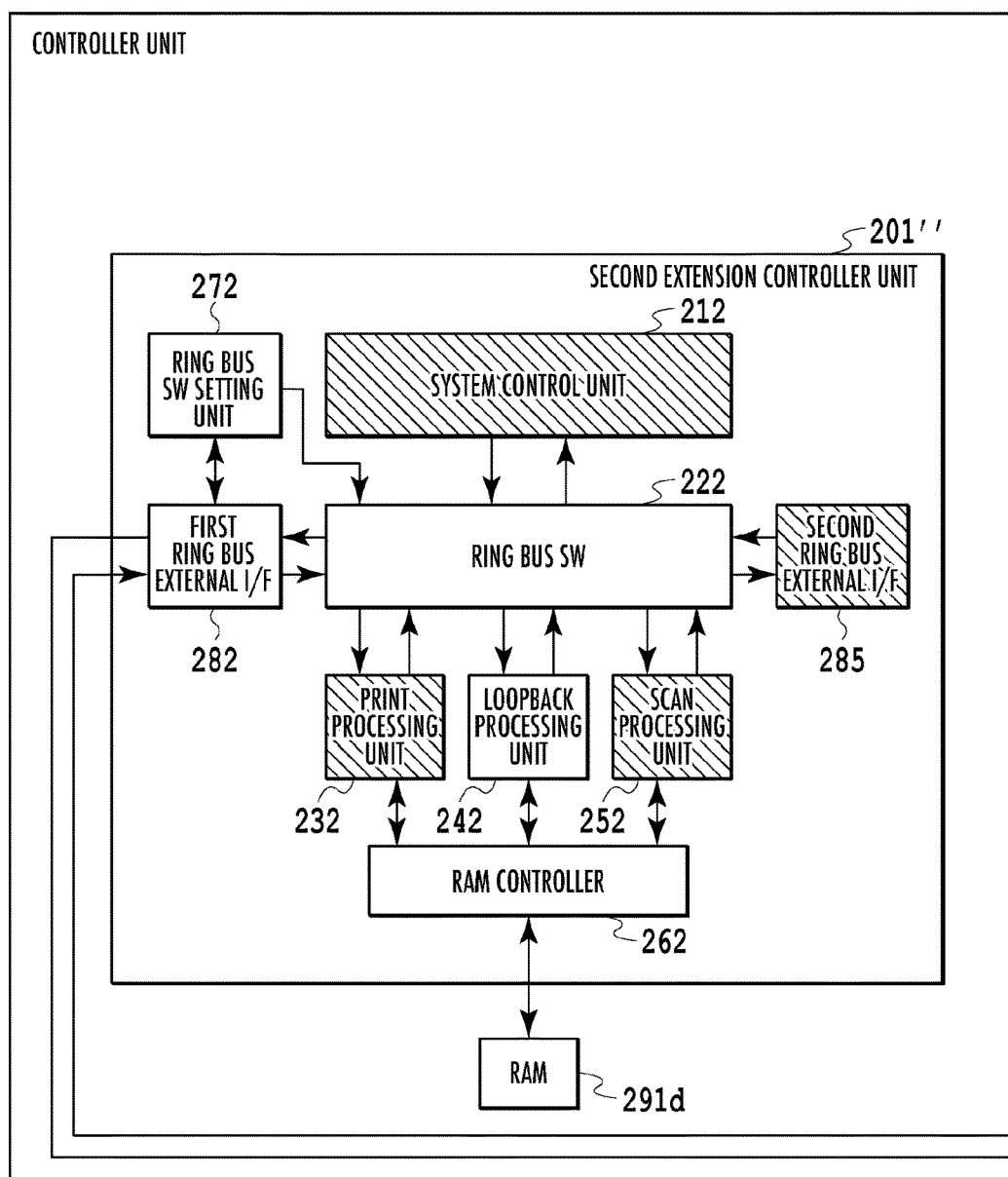
FIG. 14 is a diagram showing a relationship between FIGS. 14A, 14B and 14C, and FIGS. 14A to 14C are block diagrams showing an internal configuration of a controller unit according to a second embodiment.
Figure 14B:
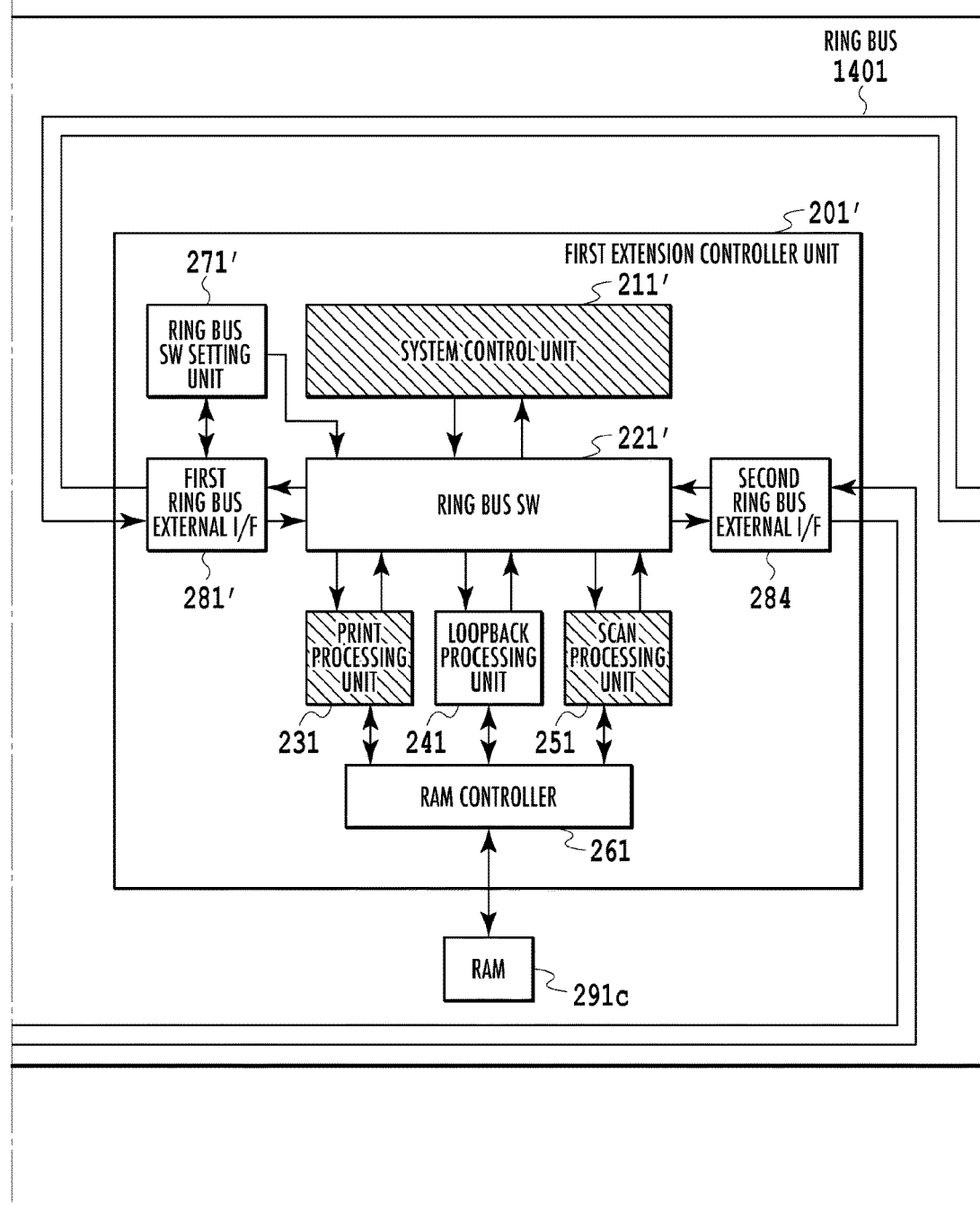

FIGS. 14A to 14C are block diagrams showing an internal configuration of a controller unit 1400 according to the present embodiment. The controller unit 1400 has a configuration in which a second extension controller unit 201" is further added to a main controller unit 200' and a first extension controller unit 201'. The main controller unit 200' and the first extension controller unit 201' corresponds to the main controller unit 200 and the first extension controller unit 201 shown in FIG. 2 of the first embodiment, respectively. Then, the second extension controller unit 201" has the same configuration as that of the first extension controller unit 201'. Further, those which are actually used as the extension functions in the present embodiment are the loopback processing unit 241 of the first extension controller unit 201' and a loopback processing unit 242 of the second extension controller unit 201". Consequently, system control units 211' and 212, the print processing unit 231 and a print processing unit 232, and the scan processing unit 251 and a scan processing unit 252 that do not need to be operated are shown in the shaded state in FIGS. 14A to 14C.

A large difference between the first embodiment and the present embodiment lies in that each controller unit (each board) has two ring bus external interface modules to connect with an external module. That is, the main controller unit 200' includes a first ring bus external interface 280' and a second ring bus external interface 283. Further, the first extension controller unit 201' includes a first ring bus external interface 281' and a second ring bus external interface 284. Then, the second extension controller unit 201" includes a first ring bus external interface 282 and a second ring bus external interface 285. Then, the first ring bus external interface 280' of the main controller unit 200' corresponds to the ring bus external interface 280 of the first embodiment. That is, the first ring bus external interface 280' connects a ring bus switch 220' of the main controller unit 200' and the first extension controller unit 201'. In the example shown in FIGS. 14A to 14C, the second ring bus external interface 283 of the main controller unit 200' is not used, and therefore, is shown in the shaded state. The first ring bus external interface 281' of the first extension controller unit 201' connects the ring bus switch 221' and the main controller unit 200'. Then, the second ring bus external interface 284 of the first extension controller unit 201' connects the ring bus switch 221' and the second extension controller unit 201". The first ring bus external interface 282 of the second extension controller unit 201" connects the ring bus switch 222 and the first extension controller unit 201'. The second ring bus external interface 285 of the second extension controller unit 201" is not used, and therefore, is shown in the shaded state.

In the present embodiment, by connecting each controller unit by using the ring bus external interface module that each controller unit has in twos, one ring bus 1401 is formed. In the case where the first extension controller unit 201' is used but the second extension controller unit 201" is not used, it is sufficient to bring the second ring bus external interface 284 of the first extension control unit 201' into the unused state and to fold back the ring bus 1401. The structures of the system control unit within each controller unit and the packet data, and each function of the print processing unit, the loopback processing unit, and the scan processing unit are quite the same as those of the first embodiment, and therefore, explanation thereof is omitted.

<Ring Bus Switch>

Figure 15:
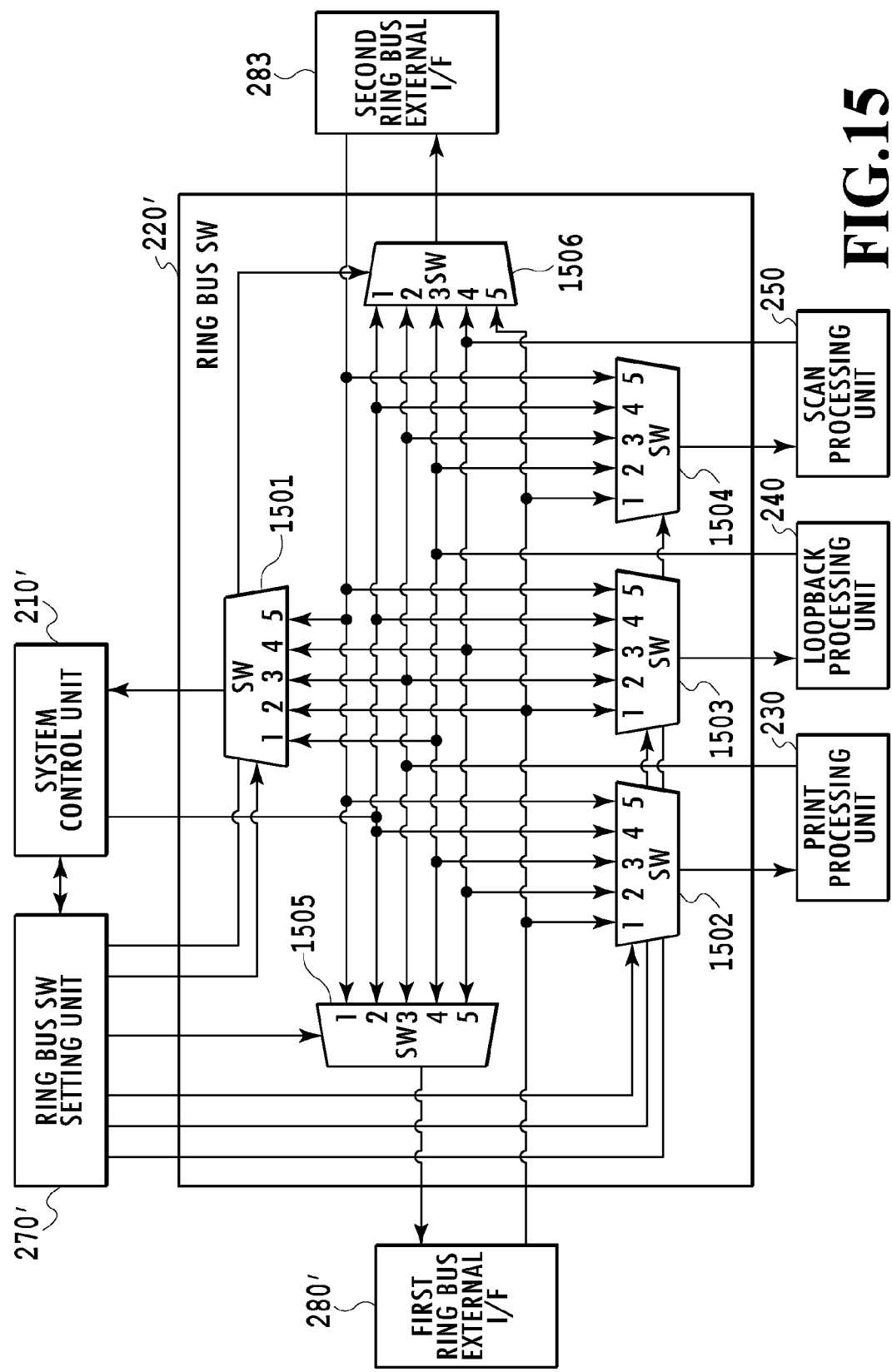
FIG. 15 is a block diagram showing an internal configuration of a ring bus switch according to the second embodiment.

FIG. 15 is a block diagram showing an internal configuration of the ring bus switch 220' within the main controller unit 200'. The internal configuration of a ring bus switch 221' within the first extension controller unit 201' and the internal configuration of a ring bus switch 222 within the second extension controller unit 201" are the same as this. The ring bus switch 220' internally has switches in the same number as the total number of modules that may be the data transfer destination in the ring bus 1401. In the present embodiment, the ring bus switch 220' has six switches 1501 to 1506 corresponding to each of a system control unit 210', the print processing unit 230, the loopback processing unit 240, the scan processing unit 250, and the first and second ring bus external interfaces 280' and 283. The ring bus switch 220' internally has the six switches 1501 to 1506. Each of the switches 1501 to 1506 switches the connection order of the ring bus 1401 within the ring bus switch 220' in accordance with a value (setting value) set by a ring bus switch setting unit 270'. Due to this, it is possible to change the connection order in accordance with the purpose on each ring bus 1401 of the system control unit 210', the print processing unit 230, the loopback processing unit 240, the scan processing unit 250, and the ring bus external interface 280'. As in the first embodiment, the above-described setting value is a fixed value, but any configuration may be accepted as long as the value can be settled before causing the ring bus 1401 to operate and a configuration may be accepted in which the setting can be changed from the outside.

<Ring Bus Switch Control>

Figure 16:
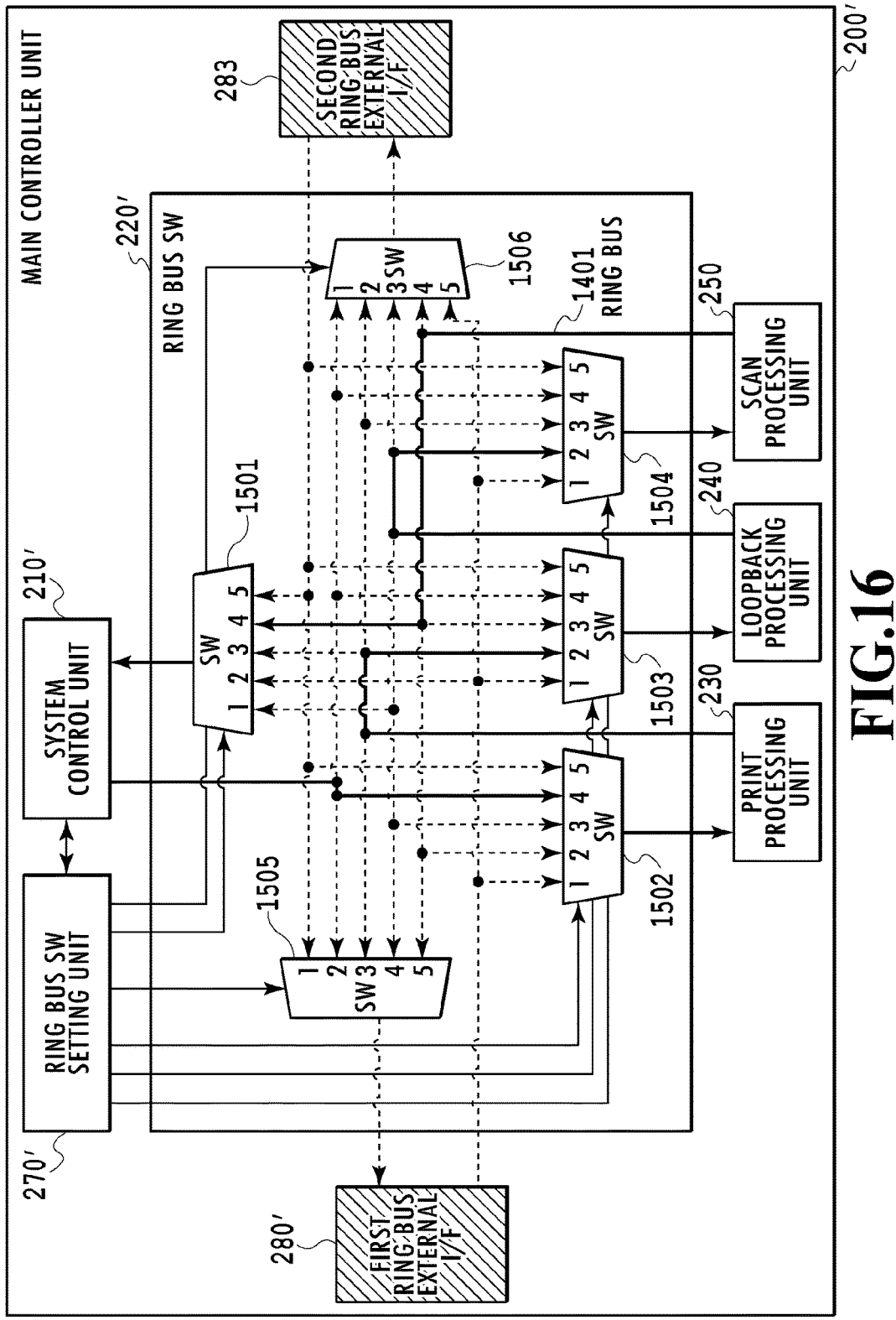
FIG. 16 is a diagram showing an example of connection control of a ring bus according to the second embodiment.
Figure 17:
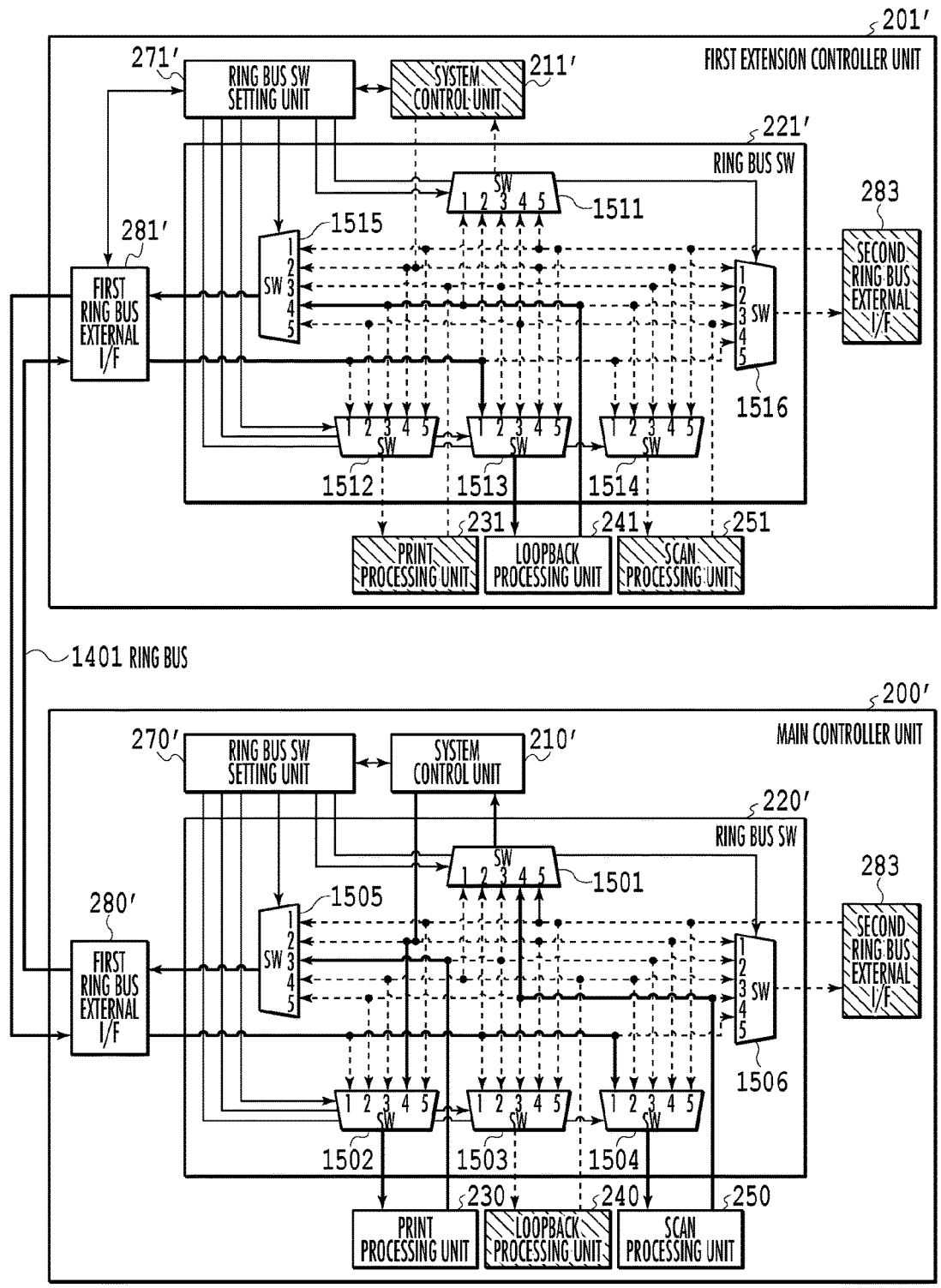
FIG. 17 is a diagram showing an example of connection control of a ring bus according to the second embodiment.
Figure 18B:
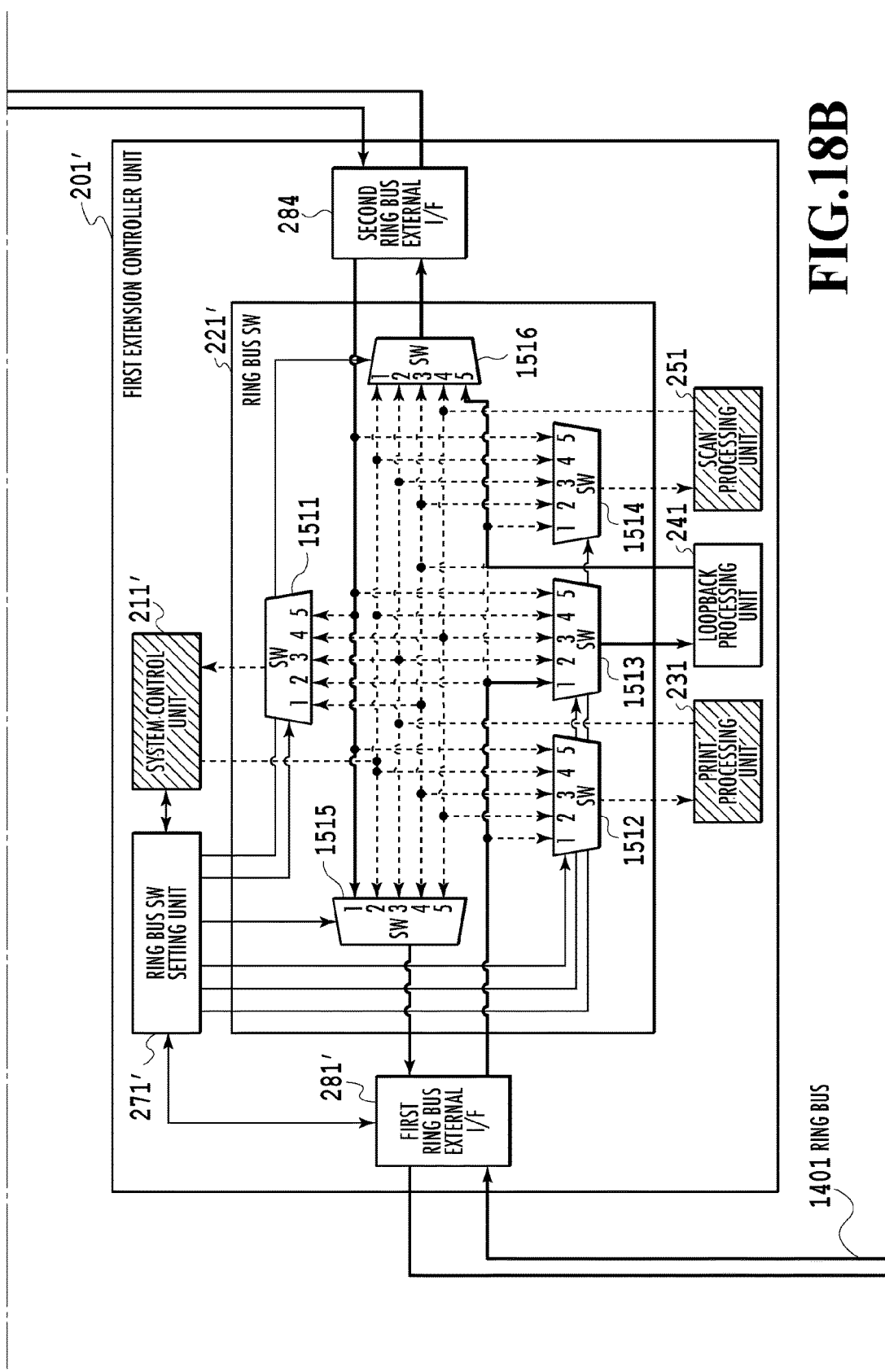
FIG. 18 is a diagram showing a relationship between FIGS. 18A, 18B and 18C, and FIGS. 18A to 18C are diagrams showing an example of connection control of a ring bus according to the second embodiment.
Figure 18C:
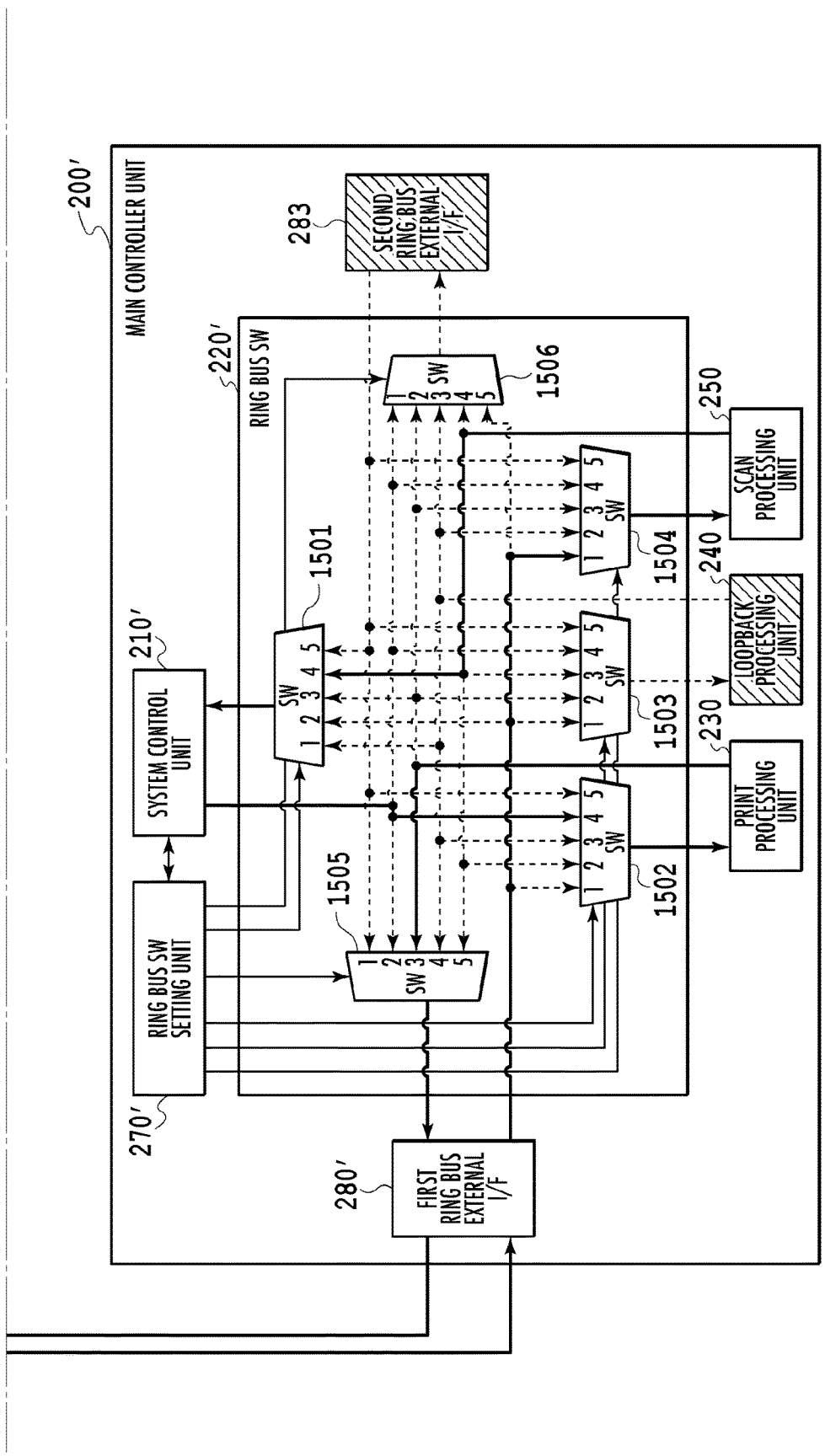

FIG. 16, FIG. 17 and FIGS. 18A to 18C are each diagrams showing an example of the connection control of the ring bus 1401 by the ring bus switch 220' (or 221' and 222). FIG. 16 shows the connection control in the case where the ring bus 1401 is completed within the main controller unit 200'. FIG. 17 shows the connection control in the case where the main controller unit 200' and the first extension controller unit 201' are connected to form the ring bus 1401. FIGS. 18A to 18C show the connection control in the case where the first extension controller unit 201' is connected to the main controller unit 200' and further, the second extension controller unit 201" is connected to the first extension controller unit 201' to form the ring bus 1401.

Then, FIG. 19 shows an internal configuration of the ring bus switch setting unit 270' according to the present embodiment. The ring bus switch setting unit 270' has registers (control registers) 1910 to 1960 to control the switches 1501 to 1506. Then, each of the control registers 1910 to 1960 is made up of a 5-bit register and for example, in the case where "1" is set to "bit 0", "input 1" is connected with the output of the switch. Similarly, in the case where "1" is set to "bit 1", "input 2" is connected to the switch output, in the case where "1" is set to "bit 2", "input 3" is connected to the output, in the case where "1" is set to "bit 3", "input 4" is connected, and in the case where "1" is set to "bit 4", "input 5" is connected with the output of the switch, respectively. Each setting value (value of each control register) in the case where the connection control shown in FIG. 16, FIG. 17 and FIGS. 18A to 18C is performed is as follows (the settings shown in parentheses are for those switches not involved in the control in the column in question).

TABLE 3

| | Connection control in FIG. 16 | Connection control in FIG. 17 | Connection control in FIGS. 18A-18C |
|---|---|---|---|
| Control register value of switch 1501 | 01000 | 01000 | 01000 |
| Control register value of switch 1502 | 01000 | 01000 | 01000 |
| Control register value of switch 1503 | 00010 | 00000 | 00000 |
| Control register value of switch 1504 | 00000 | 00001 | 00001 |
| Control register value of switch 1505 | 00000 | 00100 | 00100 |
| Control register value of switch 1506 | 00000 | 00000 | 00000 |
| Control register value of switch 1511 | (00000) | 00000 | 00000 |
| Control register value of switch 1512 | (00000) | 00000 | 00000 |
| Control register value of switch 1513 | (00000) | 00001 | 00001 |
| Control register value of switch 1514 | (00000) | 00000 | 00000 |
| Control register value of switch 1515 | (00000) | 01000 | 00001 |
| Control register value of switch 1516 | (00000) | 00000 | 10000 |
| Control register value of switch 1521 | (00000) | (00000) | 00000 |
| Control register value of switch 1522 | (00000) | (00000) | 00000 |
| Control register value of switch 1523 | (00000) | (00000) | 00001 |
| Control register value of switch 1524 | (00000) | (00000) | 00000 |
| Control register value of switch 1525 | (00000) | (00000) | 01000 |
| Control register value of switch 1526 | (00000) | (00000) | 00000 |

First, the case where the connection control in FIG. 16 is performed is explained. In the case of the configuration shown in FIG. 16, the first ring bus external interface 280' and the second ring bus external interface 283 are not used, and therefore, are shown in the shaded state. The switch 1501 outputs, in accordance with the setting value "01000", the packet data from the scan processing unit 250 corresponding to "input 4" to the system control unit 210'. The switch 1502 outputs, in accordance with the setting value "01000", the packet data from the system control unit 210' corresponding to "input 4" to the print processing unit 230. The switch 1503 outputs, in accordance with the setting value "00010", the packet data from the print processing unit 230 corresponding to "input 2" to the loopback processing unit 240. The switch 1504 outputs, in accordance with the setting value "00010", the packet data from the loopback processing unit 240 corresponding to "input 2" to the scan processing unit 250. The switches 1505 and 1506 output nothing in accordance with the setting value "0000" (the first and second ring bus external interfaces 280' and 283 enter the unused state). By controlling the ring bus switch 220' in this manner, the packet data sequentially circulates, from the system control unit 210' as its starting point, through the print processing unit 230, the loopback processing unit 240, and the scan processing unit 250 and returns to system control unit 210'. Due to this, it is made possible to form the ideal ring bus 1401 that takes into consideration the efficiency of the bandwidth inside the main controller unit 200' in the configuration including the main controller unit 200' alone, i.e., in the configuration in which the extension controller unit 201' is not connected.

Next, the case where the connection control in FIG. 17 is performed is explained. In the case of the configuration shown in FIG. 17, the second ring bus external interfaces 283 and 284 within both the controller units are not used, and therefore, are shown in the shaded state.

In the main controller unit 200', the switch 1501 outputs, in accordance with the setting value "01000", the packet data from the scan processing unit 250 corresponding to "input 4" to the system control unit 210'. The switch 1502 outputs, in accordance with the setting value "01000", the packet data from the system control unit 210' corresponding to "input 4" to the print processing unit 230. The switches 1503 and 1506 output nothing in accordance with the setting value "00000" (the loopback processing unit 240 and the second ring bus external interface 283 enter the unused state). The switch 1504 outputs, in accordance with the setting value "00001", the packet data from the first ring bus external interface 280' corresponding to "input 1" to the scan processing unit 250. The switch 1505 outputs, in accordance with the setting value "00100", the packet data from the print processing unit 230 corresponding to "input 3" to the first ring bus external interface 280'. By controlling the ring bus switch 220' in this manner, the packet data sequentially circulates, from the system control unit 210' as its starting point, through the print processing unit 230, the first ring bus external interface 280, and the scan processing unit 250 and returns to system control unit 210'. By not using the loopback processing unit 240 within the main controller unit 200' in this manner, the congestion on the data transfer path to the RAM 291b is relaxed and it is made possible to prevent a reduction in performance of the main controller unit 200'.

Further, in the extension controller unit 201', switches 1511, 1512, 1514, and 1516 output nothing in accordance with the setting value "00000". That is, the system control unit 211', the print processing unit 231, the scan processing unit 251, and the second ring bus external interface 284 enter the unused state. A switch 1513 outputs, in accordance with the setting value "00001", the packet data from the first ring bus external interface 281' corresponding to "input 1" to the loopback processing unit 241. A switch 1515 outputs, in accordance with the setting value "01000", the packet data from the loopback processing unit 241 corresponding to "input 4" to the first ring bus external interface 281'. By controlling the ring bus switch 221' in this manner, the packet data that is input to the extension controller unit 201' circulates through the loopback processing unit 241 and returns to the main controller unit 200'.

As described above, in the configuration in which only the first extension controller unit 201' is connected to the main controller unit 200' (configuration in which the second extension controller unit 201" is not connected), it is made possible to form the one ideal ring bus 1401 that takes into consideration the efficiency of the bandwidth.

Following the above, the case where the connection control in FIGS. 18A to 18C is performed is explained. In the case of the configuration shown in FIGS. 18A to 18C, the three controller units are connected with one another via the first ring bus external interfaces 280', 281', and 282 within each controller unit and the second ring bus external interface 284 within the first extension controller unit 201'. The second ring bus external interface 283 within the main controller unit 200' and the second ring bus external interface 285 within the second extension controller unit 201" are not used, and therefore, are shown in the shaded state.

In the main controller unit 200', the switch 1501 outputs, in accordance with the setting value "01000", the packet data from the scan processing unit 250 corresponding to "input 4" to the system control unit 210'. The switch 1502 outputs, in accordance with the setting value "01000", the packet data from the system control unit 210' corresponding to "input 4" to the print processing unit 230. The switches 1503 and 1506 output nothing in accordance with the setting value "00000" (the loopback processing unit 240 and the second ring bus external interface 283 enter the unused state). The switch 1504 outputs, in accordance with the setting value "00001", the packet data from the first ring bus external interface 280' corresponding to "input 1" to the scan processing unit 250. The switch 1505 outputs, in accordance with the setting value "00100", the packet data from the print processing unit 230 corresponding to "input 3" to the first ring bus external interface 280'. By controlling the ring bus switch 220' in this manner, the packet data sequentially circulates, from the system control unit 210' as its starting point, through the print processing unit 230, the first ring bus external interface 280', and the scan processing unit 250 and returns to system control unit 210'. By not using the loopback processing unit 240 within the main controller unit 200' in this manner, the congestion on the data transfer path to the RAM 291b is relaxed and it is made possible to prevent a reduction in performance of the main controller unit 200'.

Further, in the first extension controller unit 201', the switches 1511, 1512, and 1514 output nothing in accordance with the setting value "00000". That is, the system control unit 211', the print processing unit 231, and the scan processing unit 251 enter the unused state. The switch 1513 outputs, in accordance with the setting value "00001", the packet data from the first ring bus external interface 281' corresponding to "input 1" to the loopback processing unit 241. The switch 1515 outputs, in accordance with the setting value "00001", the packet data from the second ring bus external interface 284 corresponding to "input 1" to the first ring bus external interface 281'. The switch 1516 outputs, in accordance with the setting value "10000", the packet data from the loopback processing unit 241 corresponding to "input 5" to the second ring bus external interface 284. By controlling the ring bus switch 221' in this manner, the packet data that is input from the main controller unit 200' circulates through the loopback processing unit 241 and is temporarily output to the second extension controller unit 201". Then, the packet data is input again from the second extension controller unit 201" and output to the main controller unit 200'.

Then, in the second extension controller unit 201", switches 1521, 1522, 1524, and 1526 output nothing in accordance with the setting value "00000". That is, the system control unit 212, the print processing unit 232, the scan processing unit 252, and the second ring bus external interface 285 enter the unused state. A switch 1523 outputs, in accordance with the setting value "00001", the packet data from the first ring bus external interface 282 corresponding to "input 1" to the loopback processing unit 242. A switch 1525 outputs, in accordance with the setting value "01000", the packet data from the loopback processing unit 242 corresponding to "input 4" to the first ring bus external interface 282. By controlling the ring bus switch 222 in this manner, the packet data that is input from the first extension controller unit 201' circulates through the loopback processing unit 242 and returns to the first extension controller unit 201'.

As above, in the configuration in which the first and second extension controller units 201' and 202 are connected to the main controller unit 200", it is made possible to form the one ideal ring bus 1401 that takes into consideration the efficiency of the bandwidth.

In the present embodiment, the configuration is explained in which the first extension controller unit 201' is connected to the main controller unit 200' and further, the second extension controller unit 201" is connected to the first extension controller unit 201', but the configuration is not limited to this. For example, the number of function extension modules to be added may be three or more, such as in a configuration in which a third extension controller unit is further connected to the second extension controller unit 201". In the case where three or more function extension modules are connected, as in the case in FIGS. 18A to 18C described previously, it is sufficient to perform the connection control of the ring bus using the ring bus switch. Even in the case where the number of function extension modules is three or more, it is possible to form the one ideal ring bus that takes into consideration the efficiency of the bandwidth.

Further, in the present embodiment, the case is explained where the function extension is performed by connecting the extension controller unit whose configuration is the same as that of the main controller unit, but the case is not limited to this. For example, it is also possible to add a new image processing function by adding an extension printed board and the like including the two same ring bus external interface modules. Further, it is also possible to extend the function corresponding to the field of the production print by connecting an extension controller unit having a high-performance RIP processing unit.

Figure 20A:
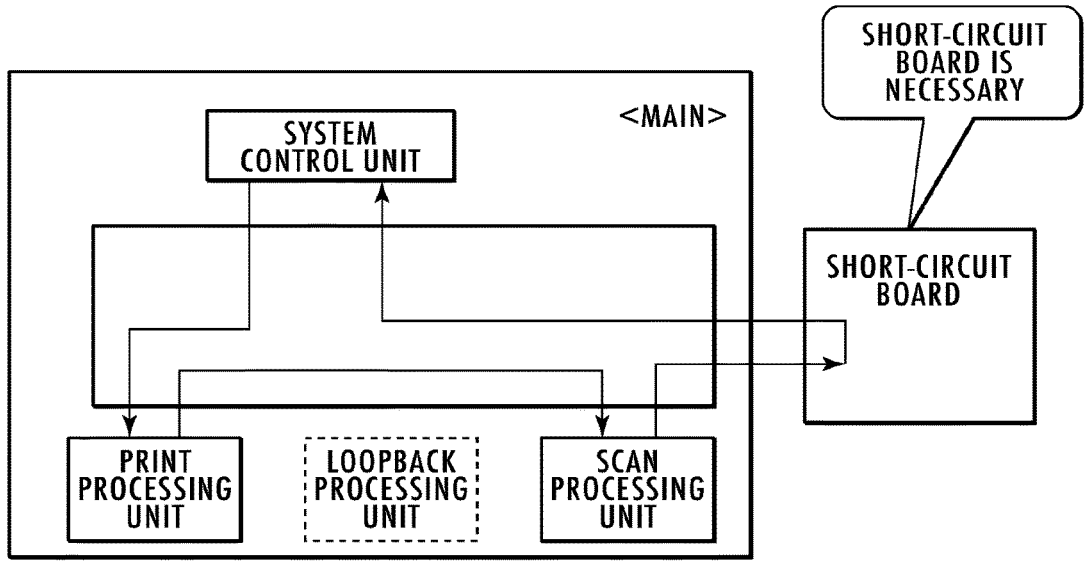
FIG. 20A and FIG. 20B are diagrams explaining an effect in the case where there is one ring bus external interface.
Figure 20B:
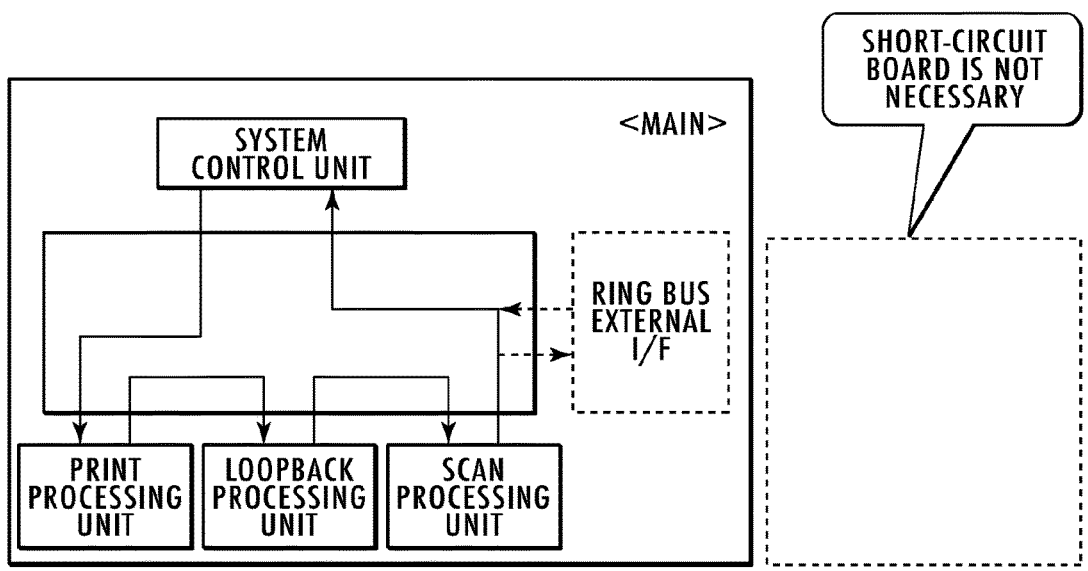
Figure 21A:
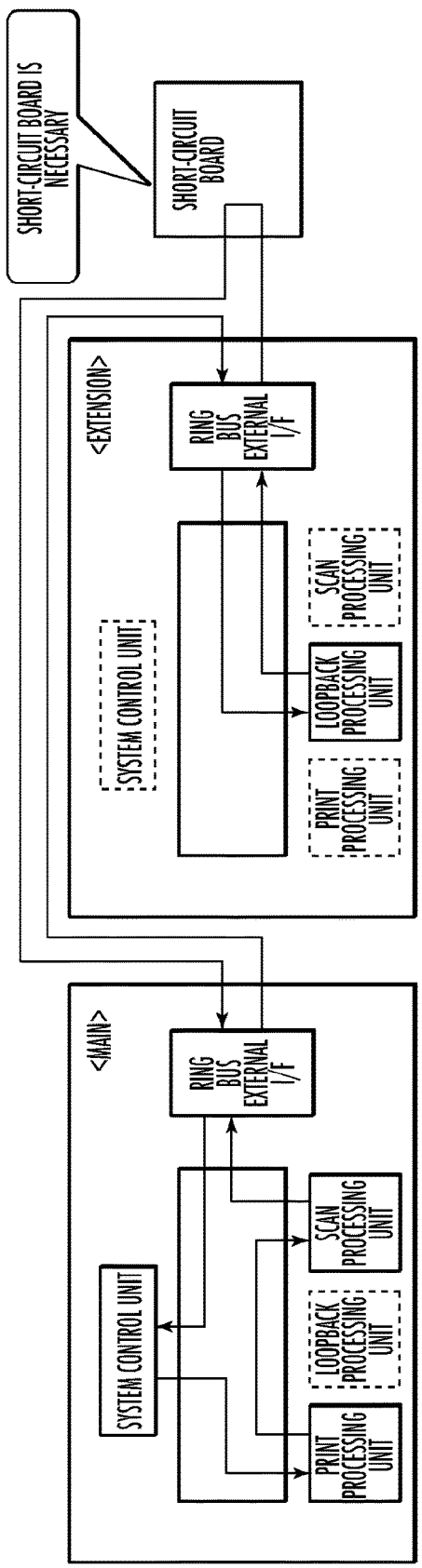
FIG. 21A and FIG. 21B are diagrams explaining an effect in the case where there are two ring bus external interfaces.
Figure 21B:
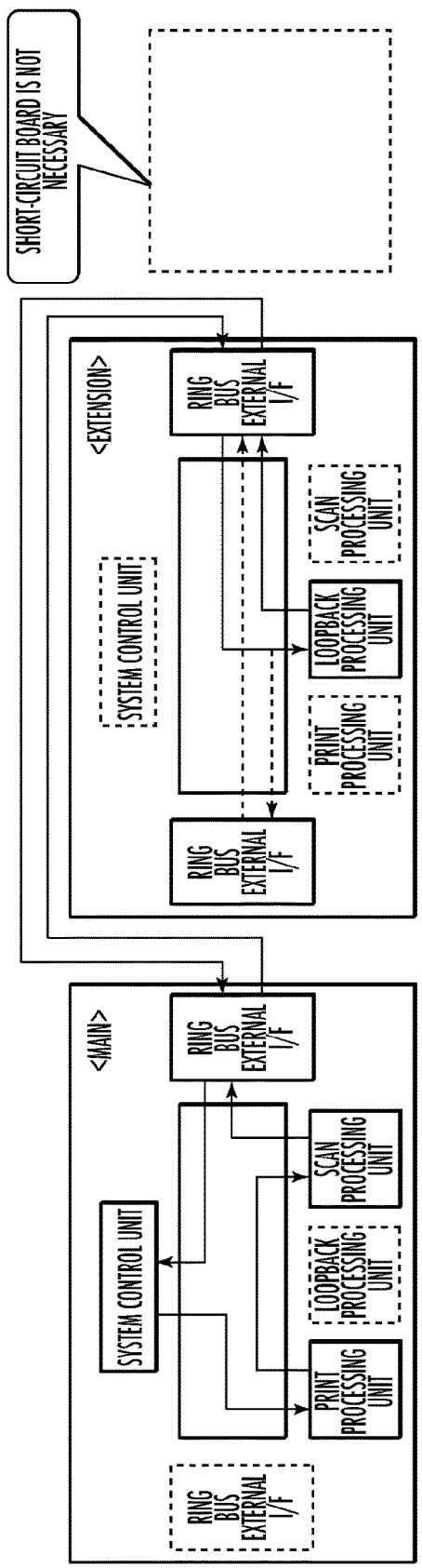

Furthermore, by providing the two ring bus external interface modules as in the present embodiment, even in the circuit configuration that still requires a short circuit (short-circuit board) to form a ring bus in the first embodiment, the short-circuit board is no longer necessary. FIG. 20A and FIG. 20B are diagrams explaining an effect in the case where there is one ring bus external interface and FIG. 21A and FIG. 21B are diagrams explaining an effect in the case where there are two ring bus external interfaces. In the following, detailed explanation is given.

First, FIG. 20A is a conventional circuit configuration diagram in the case where no extension board is used. The main board making up the control unit does not have the ring bus external interface module or the ring bus switch, and therefore, in the state where no extension board is used, a short-circuit board to short-circuit the circuit to form a ring bus is necessary. In contrast to this, FIG. 20B is a circuit configuration diagram according to the first embodiment of the present invention similarly in the case where no extension board is used. In the case of the configuration in which the main board has one ring bus external interface module, even in the state where no extension board is used, it is possible to make a short circuit within the main board by the ring bus switch control described previously. That is, in the case where the ring bus is completed within the main board without using an extension board, the short-circuit board to form a ring bus is no longer necessary.

FIG. 21A is a circuit configuration diagram in the case where function extension is performed by using an extension board and the first embodiment of the present invention is applied. In the case of the configuration in which the main board and the extension board include one ring bus external interface module, respectively, in the state where an extension board is used, a short-circuit board to form a ring bus is similarly necessary.

FIG. 21B is a circuit configuration diagram in the case where function extension is performed by using an extension board and the second embodiment of the present invention is applied. Because the extension board includes two ring bus external interface modules, even in the state where an extension board is used, it is possible to make a short circuit within the extension board by the ring bus switch control described previously. That is, the short-circuit board to form a ring bus, which is still necessary in the first embodiment, is no longer necessary in the second embodiment.

As above, according to the present embodiment, it is possible to omit the short-circuit board to complete the ring bus, and therefore, it is made possible to reduce the cost accordingly.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to connect a function extension module at a desired position on a ring bus. Due to this, it is possible to use the bandwidth on the ring bus efficiently.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-178589, filed Sep. 13, 2016 which is hereby incorporated by reference wherein in its entirety.

What is claimed is:

1. An information processing apparatus comprising:
a scanning unit that reads an image on a document;
a first controller unit having a plurality of modules to which data is input, wherein the plurality of modules include a scanning processing module that processes data output from the scanning unit, and are connected so that data output from a first module in the plurality of modules returns to the first module via another module of the plurality of modules; and
a second controller unit having a plurality of modules to which data is input, wherein the plurality of modules are connected so that data output from a first module in the plurality of modules returns to the first module via another module of the plurality of modules, wherein the first controller unit has an interface that transmits the data output from one of the plurality of modules to the second controller unit; and a switch capable of setting an output destination of data from the one module of the plurality of modules to be the interface.

2. The information processing apparatus according to claim 1, wherein the switch can switch an output destination of data received by the interface from the second controller unit.

3. The information processing apparatus according to claim 2, wherein the switch has switches in the same number as the total number of modules on the ring bus within the first controller unit, and each of the switches performs the switching in accordance with a setting value specifying a transfer destination of data input from one of the modules.

4. The information processing apparatus according to claim 3, further comprising a register to store the setting value, which corresponds to each of the switches, wherein by a value stored in the register, a module that is a transfer destination is specified among the modules.

5. The information processing apparatus according to claim 3, wherein the setting value can be changed.

6. The information processing apparatus according to claim 5, further comprising:

an operation unit for a user to perform an input operation, wherein the setting value can be changed via the operation unit.

7. The information processing apparatus according to claim 3, wherein a transfer destination of data in each of the modules is set based on efficiency of a bandwidth in the ring bus within the first controller unit.

8. The information processing apparatus according to claim 2, wherein the switch does not connect a module that is not used for processing in the plurality of modules to another module.

9. The information processing apparatus according to claim 1, wherein the switch can switch an output destination of data received by the interface from the second controller unit to the scanner processing module.

10. The information processing apparatus according to claim 1, further comprising a printer unit, wherein one of the plurality of modules that the first controller unit has is a print processing module that outputs data to the printer unit.

11. The information processing apparatus according to claim 10, wherein the switch can switch an output destination of data output from the print processing module to the interface.

12. The information processing apparatus according to claim 10, wherein one of the plurality of modules that the first controller unit has is a control module that controls the first controller unit; and data output from the control module is input to the print processing module, and data output from the scanner control module is input to the control module.

13. The information processing apparatus according to claim 12, wherein the switch sets an output destination of data from the printing processing module to be the interface, and sets an output destination of data received from the second controller unit via the interface to be the scanning processing module.

14. The information processing apparatus according to claim 1, wherein each of the first controller unit and the second controller unit has a first function module, a second function module, and a third function module, and data output from the first function module of the first controller unit is input to the second function module of the second controller unit, and data output from the second function module of the second controller unit is input to the third function module of the first controller unit.

15. The information processing apparatus according to claim 1, wherein data flows in one direction between the plurality of modules that the first controller unit has.

16. A semiconductor integrated circuit comprising:

a plurality of modules that outputs data, wherein the plurality of modules include a scanning processing module that processes data output from a scanning unit;

a bus, wherein the bus connects the plurality of modules so that data output from a first module in the plurality of modules returns to the first module via another module of the plurality of modules;

an interface that transmits data to a bus of another semiconductor integrated circuit different from the semiconductor integrated circuit; and a switch capable of switching whether an output destination of data from one of the plurality of modules is the interface.

17. The semiconductor integrated circuit according to claim 16, wherein the switch can switch an output destination of data received by the interface from the other semiconductor integrated circuit.

18. The semiconductor integrated circuit according to claim 17, wherein the semiconductor integrated circuit has a print processing module that outputs data to a printer unit.

19. The semiconductor integrated circuit according to claim 18, wherein the switch can switch an output destination of data output from the print processing module to the interface.

20. The semiconductor integrated circuit according to claim 19, wherein the semiconductor integrated circuit has a control module, and the bus connects the control module so that data output from the control module is input to the print processing module, and data output from the scanner control module is input to the control module.

21. The semiconductor integrated circuit according to claim 16, wherein the switch can switch an output destination of data received by the interface from the other semiconductor integrated circuit to the scanner processing module.

22. The semiconductor integrated circuit according to claim 16, wherein each of the semiconductor integrated circuit and the other semiconductor integrated circuit has a first function module, a second function module, and a third function module, and data output by the first function module of the semiconductor integrated circuit is input to the second function module of the other semiconductor integrated circuit, and data output by the second function module of the other semiconductor integrated circuit is input to the third function module of the semiconductor integrated module.

* * * * *